(12) United States Patent
Gauci

(10) Patent No.: US 11,679,654 B2
(45) Date of Patent: Jun. 20, 2023

(54) FOLD-BACK SOFT TOP FOR A VEHICLE

(71) Applicant: Lund Motion Products, Inc., Buford, GA (US)

(72) Inventor: Jason Gauci, Cumming, GA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 17/938,750

(22) Filed: Oct. 7, 2022

(65) Prior Publication Data

US 2023/0031681 A1 Feb. 2, 2023

Related U.S. Application Data

(63) Continuation of application No. 16/573,356, filed on Sep. 17, 2019, now Pat. No. 11,465,476.

(60) Provisional application No. 62/751,048, filed on Oct. 26, 2018.

(51) Int. Cl.
*B60J 7/12* (2006.01)

(52) U.S. Cl.
CPC .................... *B60J 7/1265* (2013.01)

(58) Field of Classification Search
CPC ........ B60J 7/1226; B60J 7/123; B60J 7/1291; B60J 7/1265
USPC .......................................................... 296/102
See application file for complete search history.

(56) References Cited

U.S. PATENT DOCUMENTS

| D259,340 S | 5/1981 | Stengel |
| 4,898,420 A | 2/1990 | Takada |
| 5,009,465 A | 4/1991 | Induni |
| D318,446 S | 7/1991 | Magyar |
| D322,055 S | 12/1991 | Bruce |
| 5,299,850 A | 4/1994 | Kaneko |
| 5,364,154 A | 11/1994 | Kaiser |
| 5,511,844 A | 4/1996 | Boardman |
| 5,673,959 A | 10/1997 | Padlo |
| 5,678,882 A | 10/1997 | Hammond |
| D394,638 S | 5/1998 | Weiner |
| D397,669 S | 9/1998 | Kornick |
| D435,509 S | 12/2000 | Hickman |

(Continued)

FOREIGN PATENT DOCUMENTS

| CN | 2174368 | 8/1994 |
| DE | 10147017 | 4/2003 |

(Continued)

OTHER PUBLICATIONS

Winchline.com/Viking_Soft_Tops, Viking Fast Back Soft Top, as existed on Feb. 24, 2009, accessed via the Internet Archive WayBack Machine on Jul. 23, 2012 at https://web.archive.org/web/20090224032201/http://winchline.com/viking_soft_tops.htm.

*Primary Examiner* — Joseph D. Pape
(74) *Attorney, Agent, or Firm* — Knobbe, Martens, Olson & Bear, LLP

(57) ABSTRACT

Disclosed herein are embodiments of a folding top assembly for use with a vehicle and methods for using a folding top assembly on a vehicle. The folding top assembly can be used to create openings on the top of the vehicle by folding a rear panel segment of the folding top assembly forward to expose a space over a rear seating area of the vehicle and/or folding a front panel segment of the folding top assembly rearward to expose a space over a front seating area of the vehicle. The assembly can be designed and shaped to improve the ability to store the folding top assembly on the vehicle and/or to improve aerodynamics when the vehicle is moving.

15 Claims, 21 Drawing Sheets

(56) References Cited

U.S. PATENT DOCUMENTS

| | | |
|---|---|---|
| 6,206,450 B1 | 3/2001 | Ide et al. |
| D445,396 S | 7/2001 | Wood |
| 6,305,734 B1 | 10/2001 | Pecho et al. |
| 6,409,248 B1 | 6/2002 | Bores |
| 6,431,635 B2 | 8/2002 | Nicastri |
| 6,439,643 B2 | 8/2002 | Barker |
| 6,827,391 B1 | 12/2004 | Kohn et al. |
| 7,025,404 B1 | 4/2006 | Gilbert |
| 7,029,052 B2 | 4/2006 | Troeger et al. |
| 7,469,954 B2 | 12/2008 | Fallis, III et al. |
| 7,510,231 B2 | 3/2009 | Lewis et al. |
| 7,523,977 B2 | 4/2009 | Fallis, III et al. |
| 7,828,364 B2 | 11/2010 | Causey |
| 8,056,956 B2 | 11/2011 | Heselhaus |
| 8,132,841 B2 | 3/2012 | Steuernagel et al. |
| D732,460 S | 6/2015 | Seneker |
| 9,139,073 B2 | 9/2015 | Haberkamp et al. |
| 9,216,632 B2 | 12/2015 | Lewis et al. |
| D756,889 S | 5/2016 | Cover |
| 10,065,486 B2 | 9/2018 | Smith et al. |
| 10,532,642 B2 | 1/2020 | Smith et al. |
| 11,198,350 B2 | 12/2021 | Smith et al. |
| 11,207,959 B2 | 12/2021 | Gauci |
| 11,465,476 B2 | 10/2022 | Gauci |
| 2007/0257521 A1 | 11/2007 | Fallis, III et al. |
| 2009/0091156 A1 | 4/2009 | Neubrand |
| 2010/0259066 A1 | 10/2010 | Haberl et al. |
| 2011/0233959 A1 | 9/2011 | Cover |

FOREIGN PATENT DOCUMENTS

| | | |
|---|---|---|
| FR | 2349469 | 11/1977 |
| JP | 2010-287135 | 10/1998 |

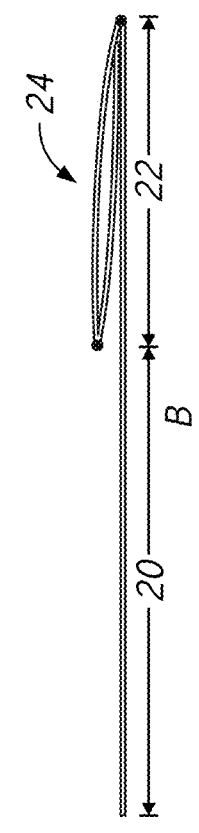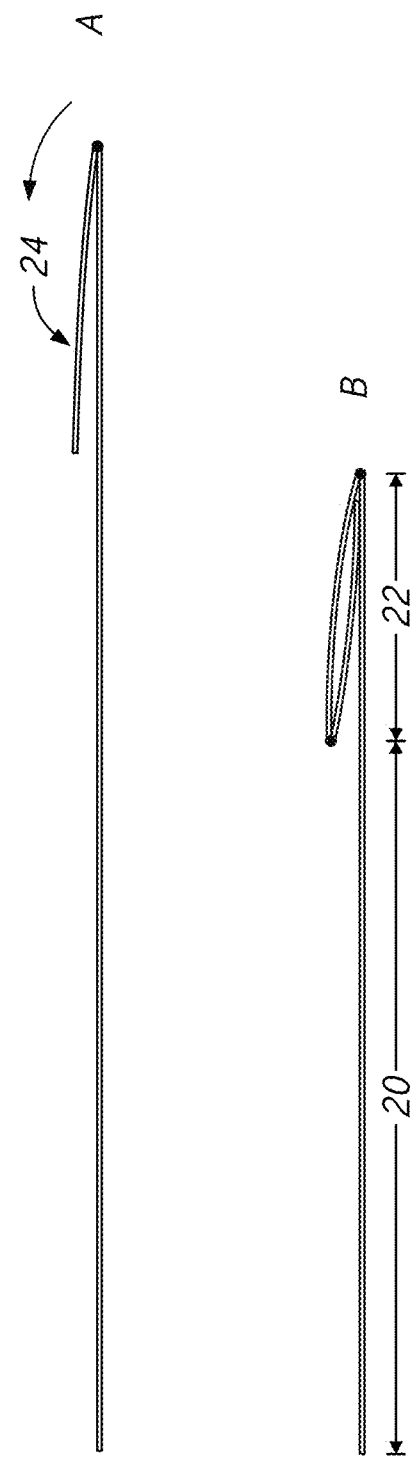
FIG. 11
FIG. 12

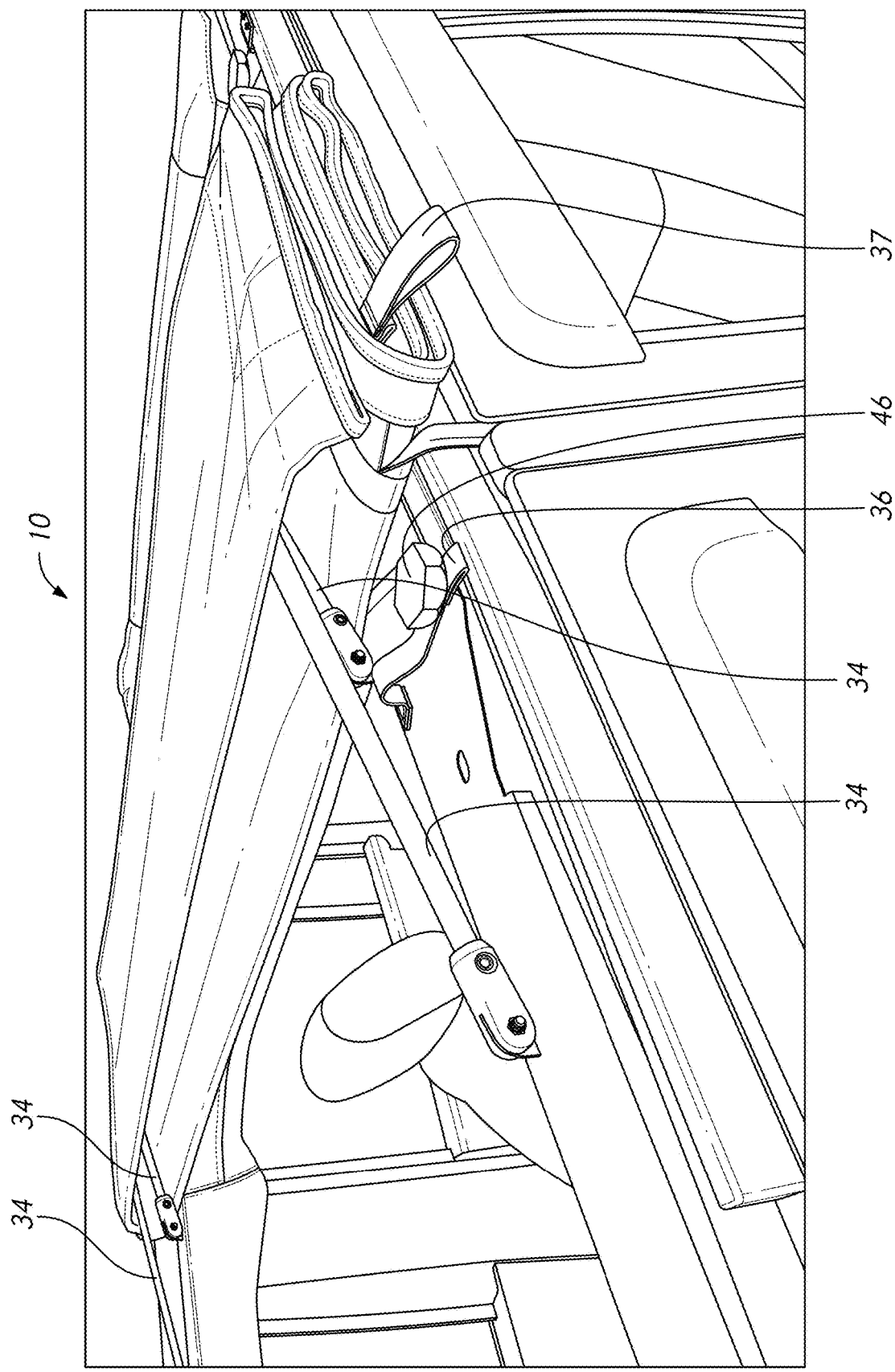

FOLD-BACK SOFT TOP FOR A VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to vehicle tops and related methods.

Description of the Related Art

Convertible vehicle tops are configured for retracting or folding to allow drivers the pleasure of driving with the top down. A typical convertible top can be retracted automatically with the push of a button or manually when the car is parked. The typical convertible top is folded upon itself and stowed away at the rear of the vehicle to expose the entire vehicle interior.

SUMMARY

Disclosed herein are embodiments of a method for using a folding top assembly on a vehicle, the vehicle having a front seating area and a rear seating area, the method comprising extending a cover over the front and rear seating areas of the vehicle, the cover having a front panel segment, a middle panel segment, and a rear panel segment, wherein each of the panel segments has an inner surface and an outer surface, folding the rear panel segment forward to expose a first space extending over the rear seating area, securing the rear panel segment in a first folded position, wherein at least a portion of the rear panel segment is folded over the middle panel segment, and folding the front panel segment rearward to expose a second space extending over the front seating area.

Also disclosed herein are embodiments of a method for using a folding top assembly on a vehicle, the vehicle having a front seating area and a rear seating area, the method comprising extending a cover over the front and rear seating areas of the vehicle, the cover having a front panel segment, a middle panel segment, and a rear panel segment, wherein each of the panel segments has an inner surface and an outer surface, folding the rear panel segment forward to expose a first space extending over the rear seating area, folding a first portion of the rear panel segment rearward over a second portion of the rear panel segment, and securing the rear panel segment in a first folded position, wherein at least a portion of the rear panel segment is folded over the middle panel segment.

In some embodiments, the method can include bending a pair of arms over the middle panel segment, the arms being coupled to the front panel segment. In some embodiments, the method can include securing the front panel segment in a second folded position, wherein at least a portion of the front panel segment is folded over the middle panel segment. In some embodiments, the method can include folding a first portion of the rear panel segment rearward over a second portion of the rear panel segment. In some embodiments, the method can include folding a first portion of the rear panel segment rearward under a second portion of the rear panel segment.

In some embodiments, folding the rear panel segment forward to expose the first space can include folding a first portion of the rear panel segment over a second portion of the rear panel segment and folding the first and second portions of the rear panel segment over the middle panel segment.

In some embodiments, the method can include folding a first portion of the rear panel segment rearward over a second portion of the rear panel segment and folding the first portion forward on top of itself.

In some embodiments, the method can include folding the front panel segment rearward to expose a second space extending over the front seating area. In some embodiments, folding the front panel segment rearward to expose the second space can include folding a first portion of the front panel segment over a second portion of the front panel segment and folding the first and second portions of the front panel segment over the middle panel segment.

In some embodiments, securing the rear panel segment in the first folded position can include coupling a first and a second strap to a first and a second lateral portion of the vehicle. In some embodiments, securing the front panel segment in the second folded position can include coupling a third and a fourth strap to a third and a fourth lateral portion of the vehicle.

In some embodiments, the method can include unlatching the cover from the vehicle. In some embodiments, the method can include installing a frame assembly on the vehicle. In some embodiments, the frame assembly can have a plurality of door surrounds, a first pair of arms, and a second pair of arms. In some embodiments, the door surrounds can have a channel.

In some embodiments, the method can include installing a plurality of doors on the vehicle. In some embodiments, the cover can have interengaging portions disposed on an inner surface of the cover that are configured to engage a channel on the vehicle.

In some embodiments, the method can include securing the cover in an extended position. In some embodiments, securing the cover in the extended position can include retaining interengaging portions of the cover in channels disposed on the vehicle and coupling a first and a second fastener to a first and a second rear beam of the vehicle.

In some embodiments, the front panel segment can be configured to cover and/or expose the second space extending over the front seating area. In some embodiments, the rear panel segment can be configured to cover and/or expose the first space extending over the rear seating area. In some embodiments, the middle panel segment can be disposed between the front panel segment and the rear panel segment.

In some embodiments, the method can include coupling a central fastener disposed on an inner surface of the cover to a cross beam of the vehicle. In some embodiments, the inner surface of each of the panel segments can face an interior of the vehicle and the outer surface of each of the panel segments can face away from the interior of the vehicle when the cover is in an extended position.

In some embodiments, folding the rear panel segment forward can include placing at least a portion of the outer surface of the rear panel segment in contact with the outer surface of the middle panel segment. In some embodiments, folding the front panel segment rearward can include placing at least a portion of the outer surface of the front panel segment in contact with at least a portion of the outer surface of the rear panel segment.

BRIEF DESCRIPTION OF THE DRAWINGS

These and other features and advantages of the present devices, systems, and methods will become appreciated as the same becomes better understood with reference to the specification, claims and appended drawings wherein:

FIGS. 11-13 show examples of the cover of the folding top assembly of FIG. 1 being folded to expose a rear seating area of a vehicle;

FIG. 22 shows a perspective view of the folding top assembly of FIG. 1 with the front and rear seating areas of a vehicle exposed.

DETAILED DESCRIPTION

The detailed description set forth below in connection with the appended drawings is intended as a description of the presently preferred embodiments of folding tops provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
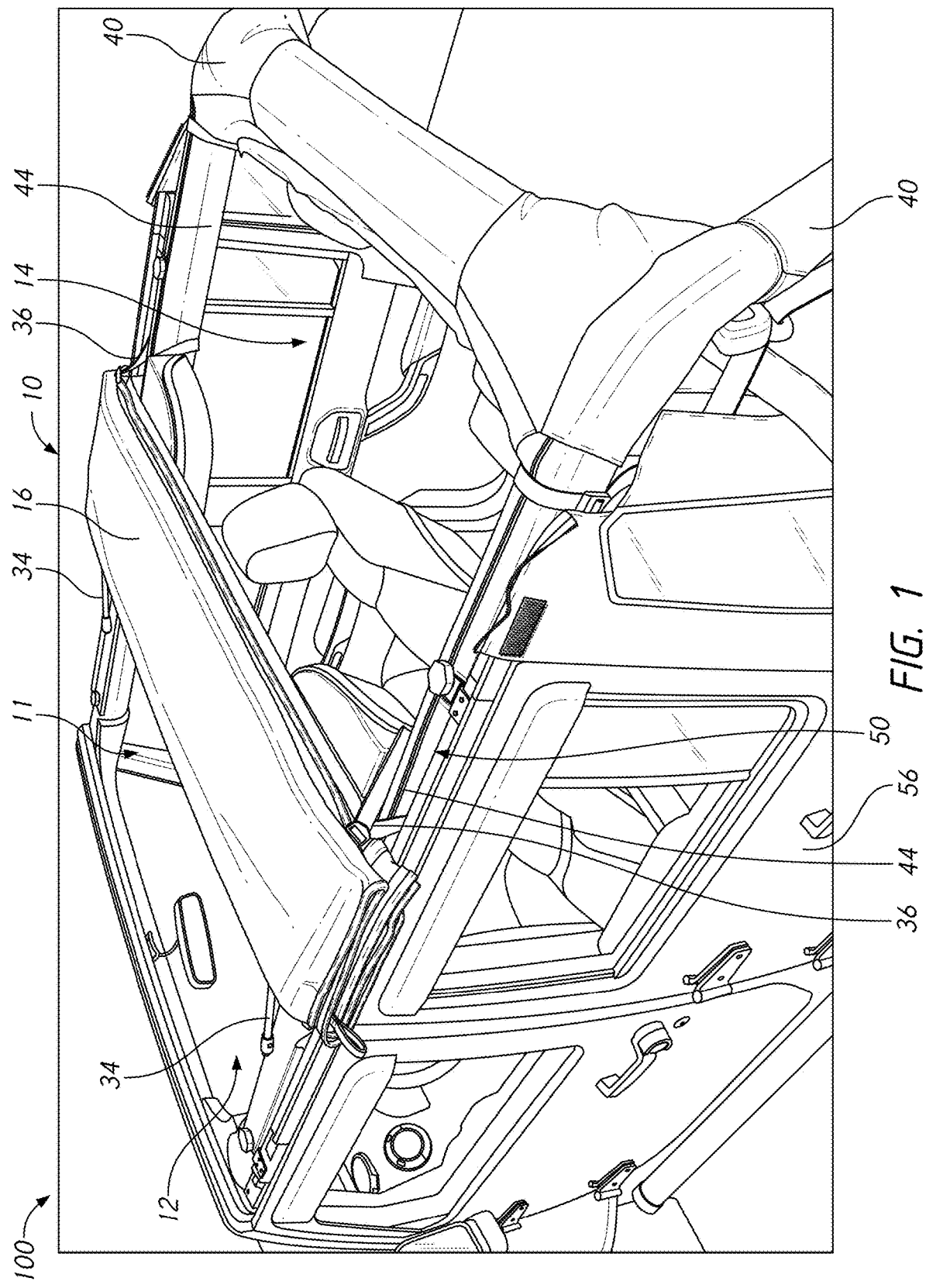
FIG. 1 shows a perspective view of an embodiment of a folding top assembly assembled on a vehicle.

FIG. 1 illustrates one position of an embodiment a folding top assembly 10 assembled on a vehicle 100, such as a Jeep Wrangler. The folding top assembly 10 can be assembled on any suitable vehicle, such as a vehicle with an opening above the front and rear seating areas 12, 14 of the vehicle 100. The folding top assembly 10 can be coupled to a frame assembly 50 of the vehicle 100, as an original convertible top or a replacement top. The folding capability of the folding top assembly 10 provides the driver and passengers of the vehicle 100 having the folding top assembly 10 with various options regarding the degree to which the vehicle 100 is open to the environment. Previously, most available folding tops for vehicles provided fewer positions for the cover. Reference to the words front, rear, left, and right are understood to be based on positions of a vehicle, such as front, rear, left, and right side of the vehicle.

The folding top assembly 10 can have various positions. In some embodiments, the folding top assembly 10 can have various folded positions and various extended positions. For example, as shown in FIG. 1, the folding top assembly 10 can be folded on top of itself in a folded or stored position towards the middle of the opening 11 in the vehicle 100. The folding top assembly 10 can be stored towards the front of the opening 11, towards the middle of the opening 11, and/or towards the rear of the opening 11. The folding top assembly 10 can be stored and/or used on the vehicle such that the folding top assembly 10 is secure while the vehicle is moving. The folding top assembly 10 can be designed to be water-resistant or to prevent water from collecting on the folding top assembly 10. The folding top assembly 10 can be designed to improve aerodynamics of the vehicle 100 when the vehicle is moving.

Figure 2:
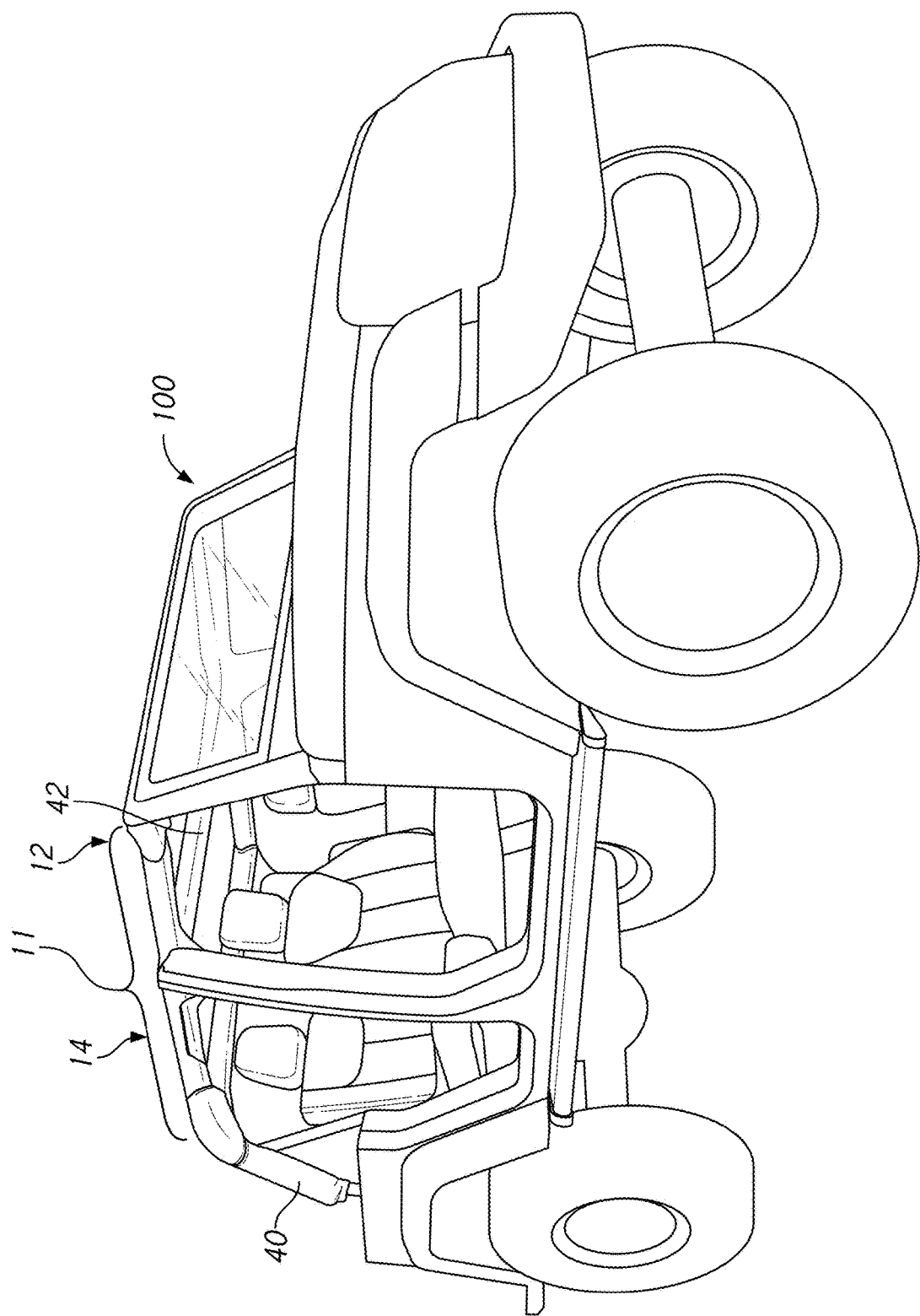
FIG. 2 shows an embodiment of a vehicle that can be configured to engage the folding top assembly of FIG. 1.

FIG. 2 illustrates an embodiment of a vehicle 100 that can be configured to receive the folding top assembly 10. In some embodiments, the vehicle 100 can have a front seating area 12 and a rear seating area 14. The vehicle can have rear beams 40, cross beams 42 and side beams 44. The folding top assembly 10 can be quickly and conveniently installed on a roof or opening 11 extending above a front seating area 12 and/or rear seating area 14 of the vehicle 100 and can be easily moved between, and secured in, different extended and folded positions. In some embodiments, the user can move the folding top assembly 10 between, and/or secure the folding top assembly 10 in, different positions while the user is inside of the vehicle. In some embodiments, the user can move the folding top assembly 10 between, and/or secure the folding top assembly 10 in, different positions while the user is outside of the passenger compartment of the vehicle 100.

Figure 3:
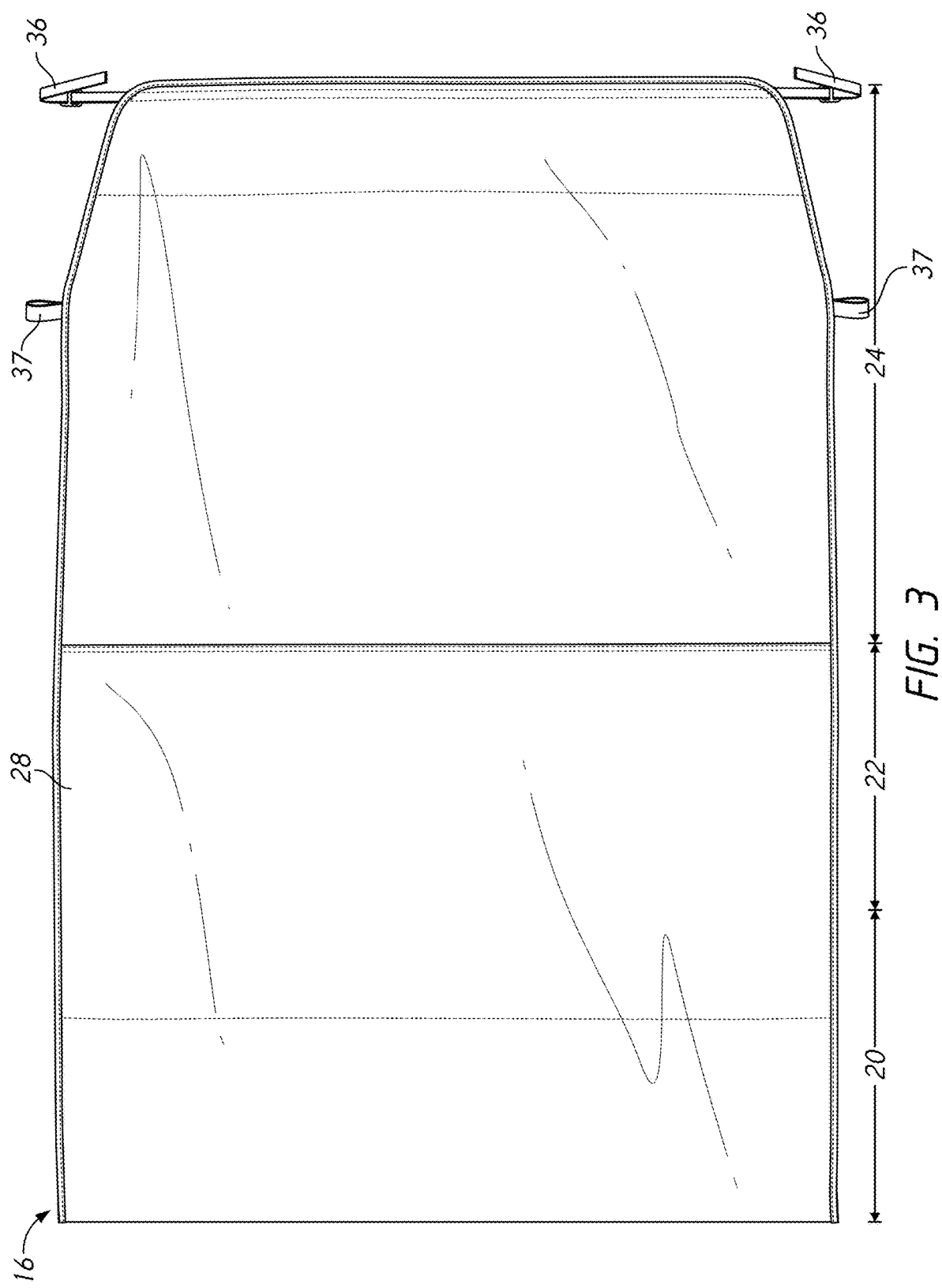
FIG. 3 shows a top view of the cover of the folding top assembly of FIG. 1.
Figure 4:
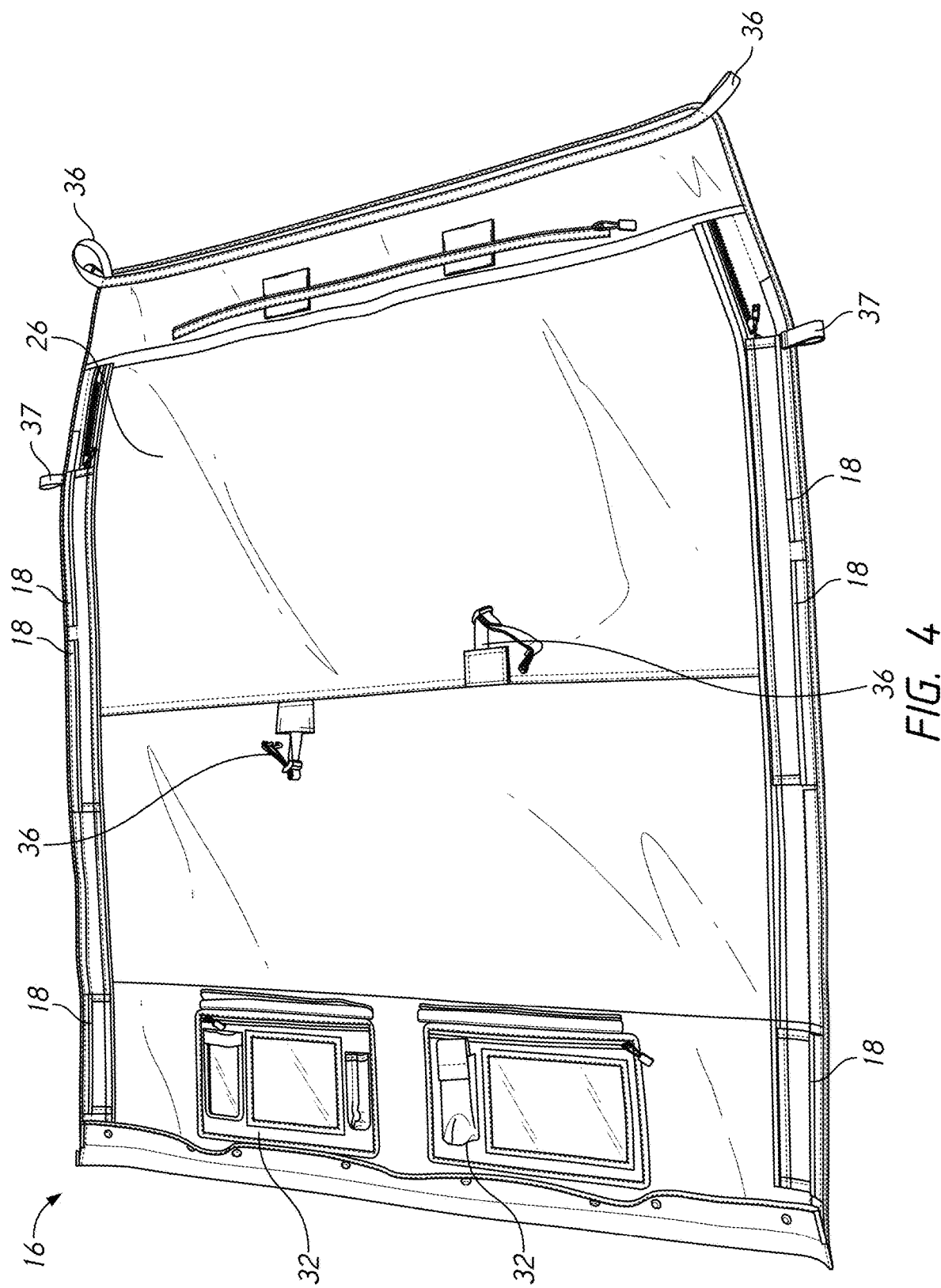
FIG. 4 shows a bottom view of the cover of the folding top assembly of FIG. 1.

As shown in FIGS. 3 and 4, the folding top assembly 10 can include a cover 16. The cover 16 can have an inner surface 26 and an outer surface 28. As illustrated in FIG. 3, in some embodiments, the cover 16 can have a front panel segment 20, a middle panel segment 22, and a rear panel segment 24. In some embodiments, the middle panel segment 22 is disposed between the front panel segment 20 and the rear panel segment 24. The lengths of each of the panel segments relative to the total length of the cover 16 can vary. The front panel segment 20 can extend above the front seating area 12 when the folding top assembly 10 is in an extended position. The rear panel segment 24 can extend above the rear seating area 14 when the folding top assembly 10 is in an extended position. The middle panel segment 22 can extend above an area between the front seating area 12 and the rear seating area 14. The middle panel segment 22 can extend over portions of at least one of the front seating area 12 and the rear seating area 14. The panel segments can be similarly sized and/or can differ in length, width, and/or thickness.

As illustrated in FIG. 3, the panel segments can have creases or other similar features that enable the user to fold the cover 16 more easily. For example, in some embodiments, at least one panel segment can have a crease formed in it such that the cover 16 can easily fold along said crease. In some embodiments, the cover 16 can be biased towards or have a tendency towards folding along particular areas or creases in the cover. In some embodiments, the user can fold the cover 16 in any suitable manner. For example, in some embodiments, the cover 16 comprises a material that is easily folded (e.g., a flexible or soft material). In some embodiments, the panel segments of the cover 16 can fold substantially flat on one another. As shown in FIGS. 3 and 4, each of the panel segments 20, 22, 24 can have an inner surface 26 and an outer surface 28. In some embodiments, the inner surface 26 of each of the panel segments 20, 22, 24 faces an interior of the vehicle 100 when the cover 16 is in an extended position and the outer surface 28 of each of the panel segments 20, 22, 24 faces away from the interior of the vehicle when the cover 16 is in the extended position. The inner surface 26 of the cover 16 can face in a first direction and the outer surface 28 of the cover 16 can face in a second direction opposite the first direction.

The cover 16 can include fasteners 36 such as tabs, straps, zippers, and/or latches. The fasteners 36 can be connected to the cover 16 and/or can be separate components from the cover 16. The fasteners 36 can be removable from the cover 16. The sizes, shapes, and positions of the fasteners 36 can vary. For example, the fasteners 36 can be disposed on one end of the cover 16, in the center of the cover 16, along multiple panel segments of the cover 16, and/or on at least one of the inner surface 26, the outer surface 28, or a side surface of the cover 16. The degree to which the cover 16 is secured to the vehicle 100 when the folding top assembly 10 is in an extended position or a folded position can vary. In some embodiments, the fasteners 36 can be adjusted and/or tightened by the user. This allows the user to increase the tension in the cover 16 to make the cover 16 taut or otherwise sit flatter when in an extended or folded position.

Different combinations of types of fasteners 36 can be used to secure the cover 16 to the vehicle 100. The fasteners 36 can be secured to the frame assembly 50, rear beams 40, cross beams 42, and/or side beams 44 of the vehicle 100. For example fasteners 36 can be disposed towards the center of the inner surface 26 of the cover 16 and can engage or wrap around a cross beam 42 of the vehicle 100.

The folding top assembly 10 can include a storage compartment 32. A storage compartment 32 can be coupled to the inner surface 26, the outer surface 28, a side surface, or any suitable surface of the cover 16. For example, as illustrated in FIG. 4, storage compartments 32 can be coupled to the inner surface of the cover 16. The storage compartment 32 can comprise at least one pocket. The pockets can be open on at least one end and/or can be secure (e.g., configured to be opened and closed by use of a zipper). The storage compartment 32 can be configured to store belongings such as sunglasses, tools, garage door openers, etc.

Figure 5:
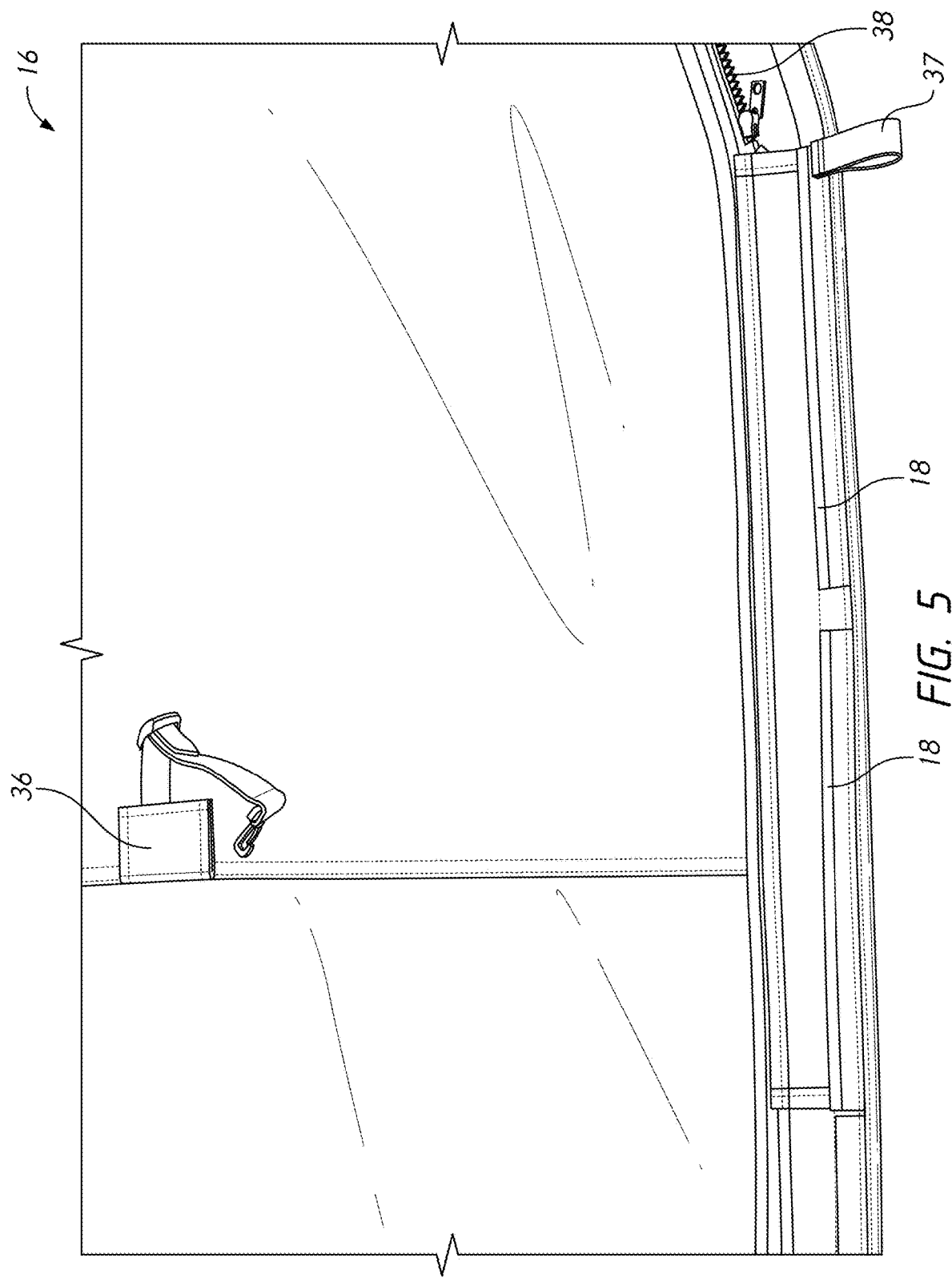
FIG. 5 shows a detailed bottom view of the cover of the folding top assembly of FIG. 1.

Components of the frame assembly 50 can engage components of the cover 16. For example, in some embodiments, the cover 16 can have interengaging portions 18 (e.g, such as a tongue or hook and groove engagement) configured to cooperate with the frame assembly 50, in some embodiments, the interengaging portions can be interlocking portions. As illustrated in FIGS. 4 and 5, in some embodiments, interengaging portions 18 are disposed on an inner surface of the cover 16. In some embodiments, the interengaging portions 18 are projections, such as hollow tubes or solid members, on the cover 16 that are configured to engage channels 54 of the frame assembly 50. The interengaging portions 18 can be made of a resilient material. The interengaging portions 18 can be disposed along the periphery of the inner surface 26 of the cover 16 and engage channels 54 disposed on lateral portions of the frame assembly 50.

Figure 6:
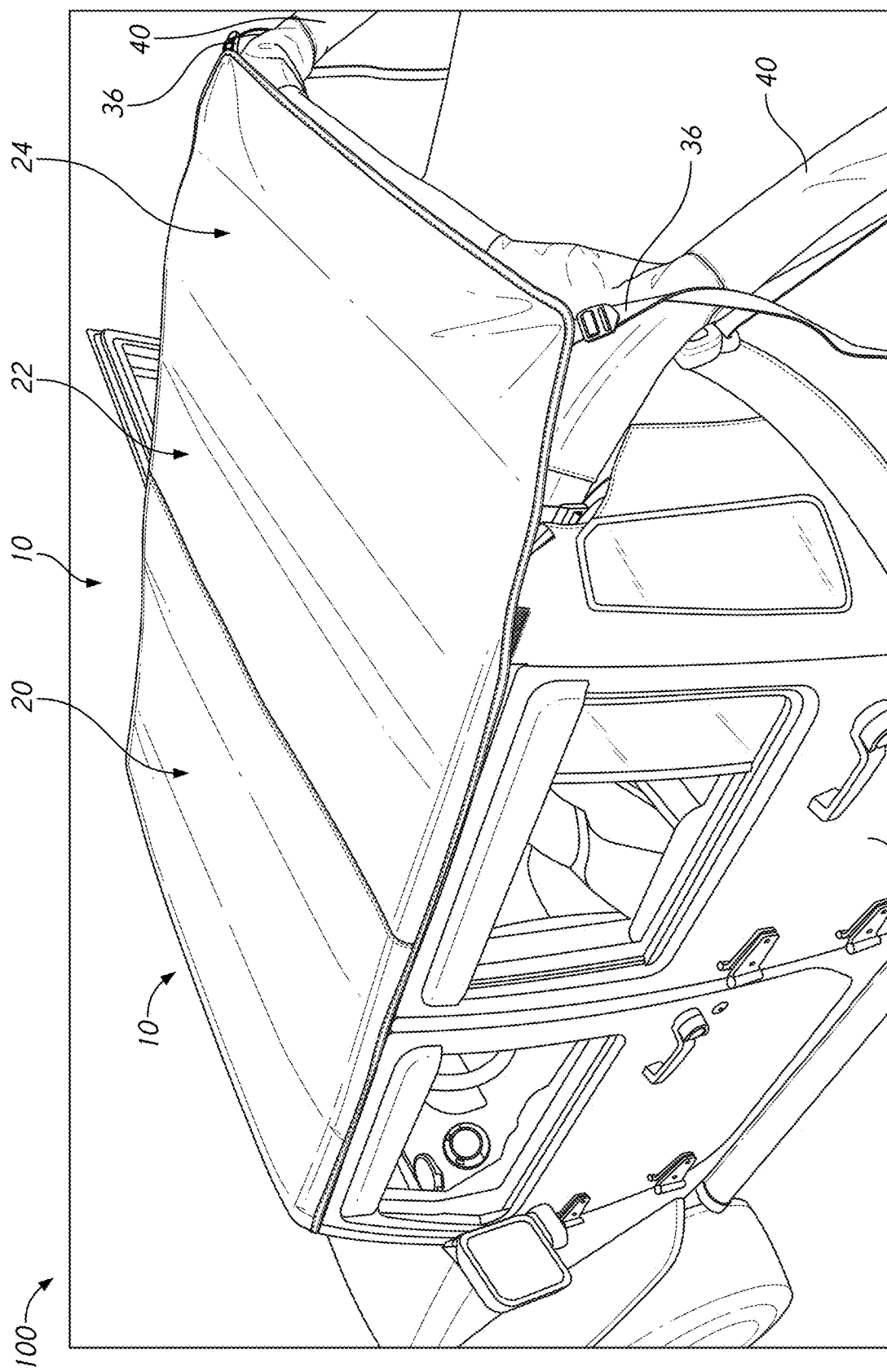
FIG. 6 shows a perspective view of the folding top assembly of FIG. 1 extending over a vehicle.
Figure 8:
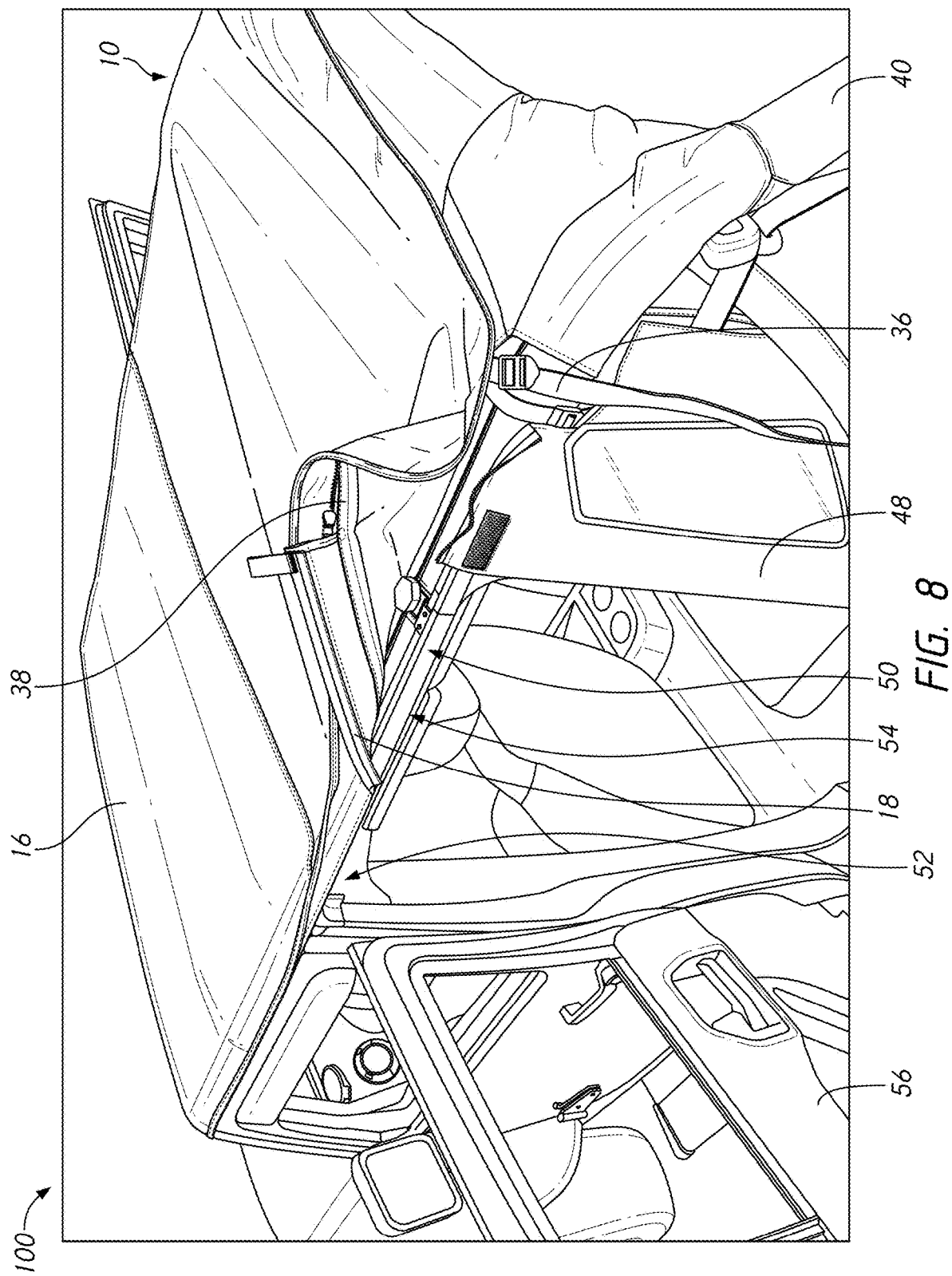
FIG. 8 shows a perspective view of the cover of the folding top assembly of FIG. 1 being unlatched from a vehicle.

As illustrated in FIG. 6, in some embodiments, the cover 16 can be extended over the front and rear seating areas 12, 14 of the vehicle 100. In some embodiments, the cover 16 can be secured to the vehicle 100 in an extended position. Securing the cover 16 to the vehicle 100 in an extended position can include retaining interengaging portions 18 of the cover 16 in channels 54 disposed on the vehicle 100 and/or coupling fasteners 36 to rear beams 40 of the vehicle 100. Portions of the cover 16 can be secured to other vehicle covers 48 disposed on the vehicle. For example, as shown in FIG. 8, the cover 16 can have a zipper 38 that engages a compatible zipper on the other vehicle cover 48. This can enhance the seal between the cover 16 and the vehicle 100.

In some embodiments, a seal can be provided to form a snug fit between the folding top assembly 10 and the vehicle 100 and help minimize or prevent dust, dirt, moisture, or other contaminants from entering the vehicle 100 through the opening 11. The seal can be fixed to the folding top assembly 10 or the vehicle 100, or a separate component sandwiched between the folding top assembly 10 and the vehicle 100.

Figure 7:
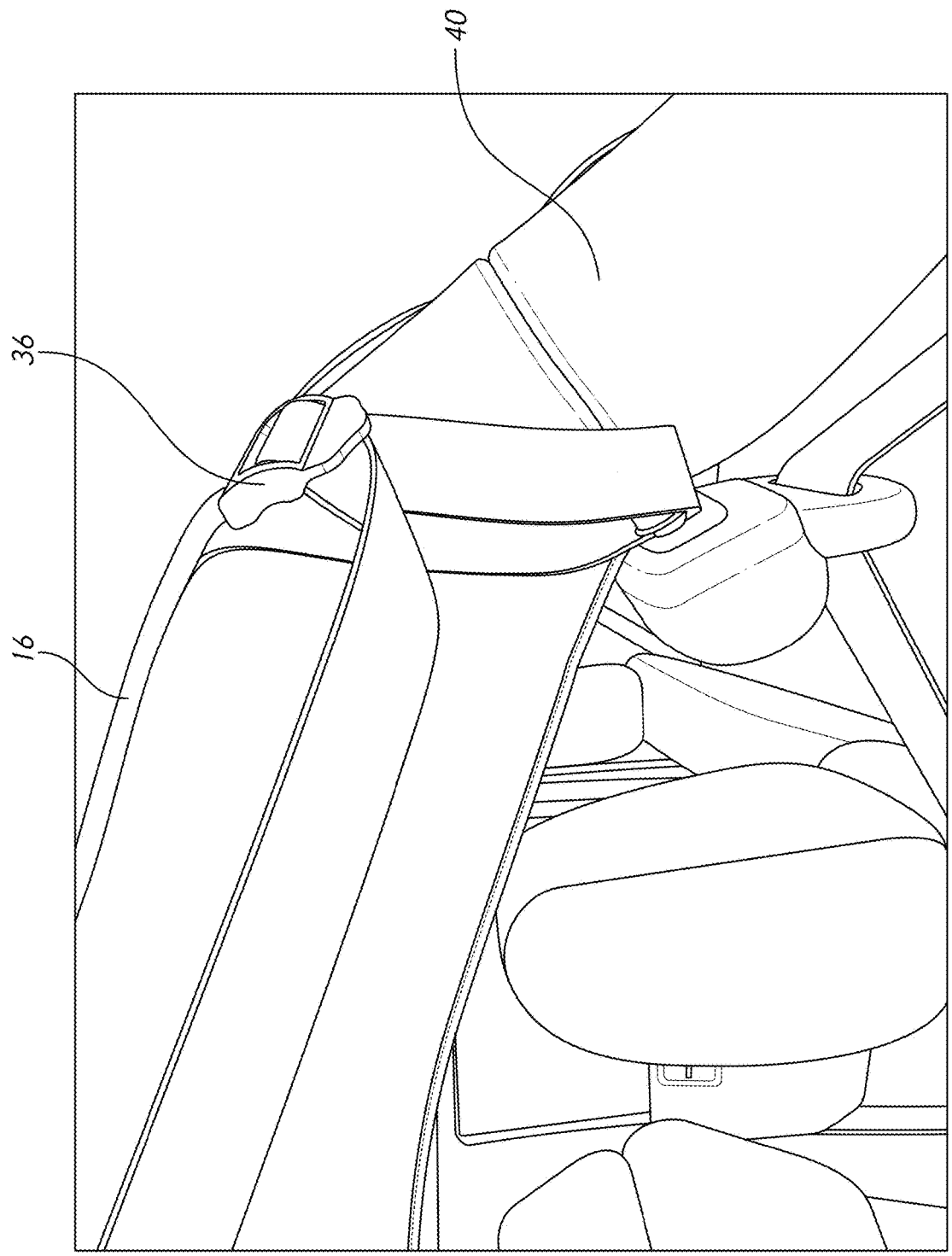
FIG. 7 shows an enlarged view of a strap of the folding top assembly of FIG. 1.

FIG. 7 shows a detailed view of a fastener 36 secured to a rear beam 40 of the vehicle 100 with the folding top assembly 10 in an extended position. The rear beams 40 of the vehicle 100 can be disposed behind the rear seating area 14 of the vehicle 100. The fasteners 36 can be adjusted by the user by pulling on a strap to cause the amount of space between a given fastener 36 and beam 40, 42, 44 of the vehicle 100 to decrease. This can increase the amount of tension in the cover 16 and can improve the aesthetics of the cover 16 when assembled on the vehicle 100.

Figure 14:
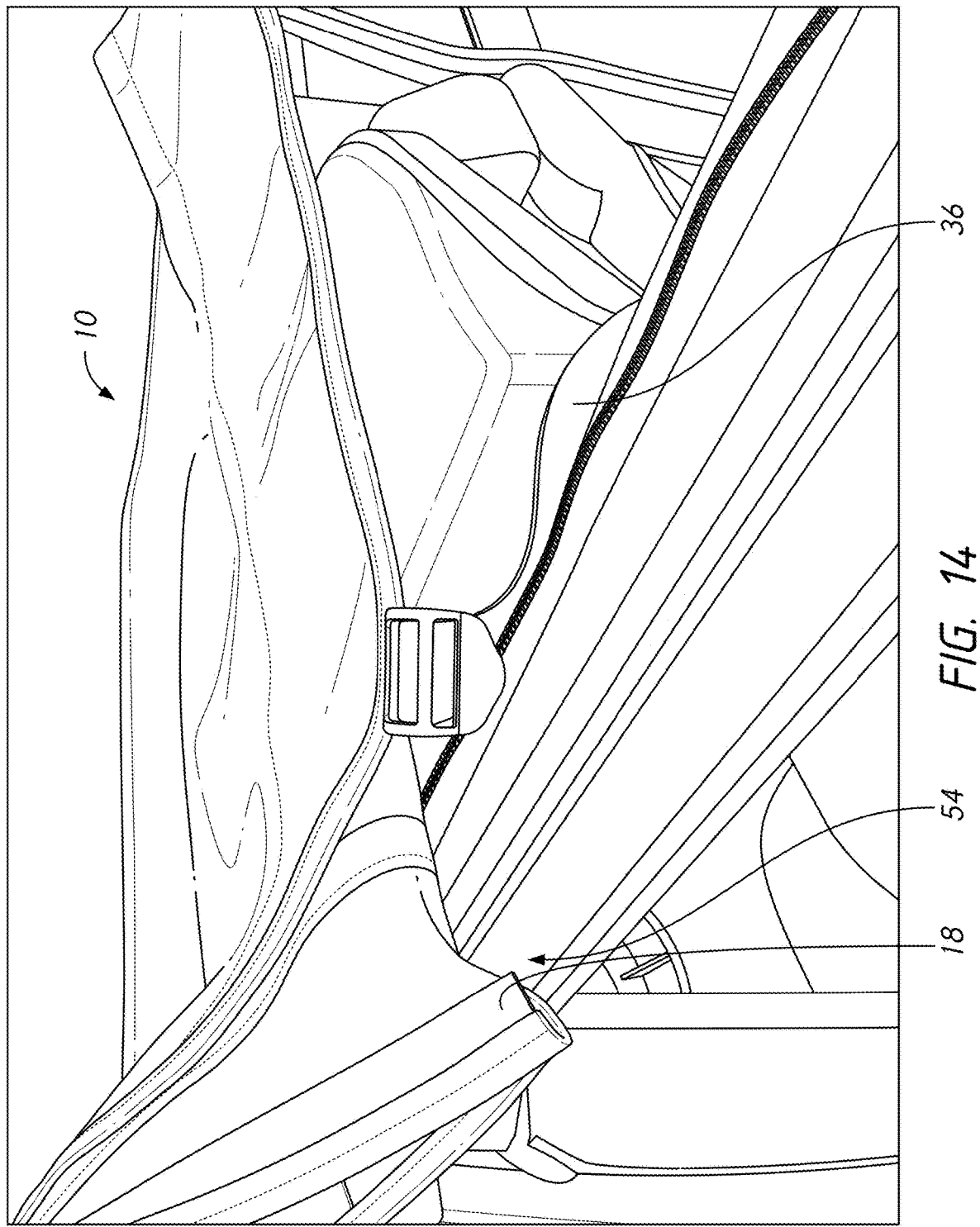
FIGS. 14-15 show detailed views of a strap of the folding top assembly of FIG. 1.

As illustrated in FIGS. 8 and 14, in some embodiments, the cover 16 can be at least partially unlatched or unsecured from the vehicle 100. The interengaging portions 18 of the cover 16 can be disengaged from the channels 54 of the frame assembly 50. The zippers 38 can be disengaged from the corresponding zippers on the other covers 48. The fasteners 36 can be unsecured from the rear beams 40, cross beams 42, and/or side beams 44. The cover 16 can be completely unsecured from the vehicle 100 and removed. The cover 16 can be partially unsecured from the vehicle 100 in the process of folding or moving the cover 16 from one position to another.

In some embodiments, the folding top assembly 10 can include a frame assembly 50 for supporting the cover 16. In some embodiments, a frame assembly 50 for supporting the cover 16 can be installed on the vehicle 100 before the folding top assembly 10 is assembled. Desirably, the frame assembly 50 can include a first longitudinal portion and a second longitudinal portion opposite the first longitudinal portion extending above a plurality of entrances to the vehicle 100 along lateral sides of the vehicle 100. The frame assembly 50 can include at least one cross-member extending between the first and second longitudinal portions. In some embodiments, the frame assembly 50 includes a first cross-member extending between the first and second longitudinal portions above a forward portion of the front seating area 12 and a second cross-member extending between the first and second longitudinal portions above a rearward portion of the rear seating area 14. As illustrated in FIG. 1, the frame assembly 50 can include bolsters disposed towards the middle of the vehicle 100, adjacent to each of the first and second longitudinal portions. The bolsters can advantageously assist in supporting the cover 16 when the cover 16 is in a folded position. The frame assembly 50 can include a plurality of door surrounds 52 defining channels 54 that are configured to engage portions of the cover 16. In some embodiments, a plurality of doors 56 can be installed on the vehicle 100 and can be integral with, or separate from, the frame assembly 50. In some embodiments, the frame assembly 50 includes a first and second pair of arms 34, which will be described in greater detail below.

Figure 17:
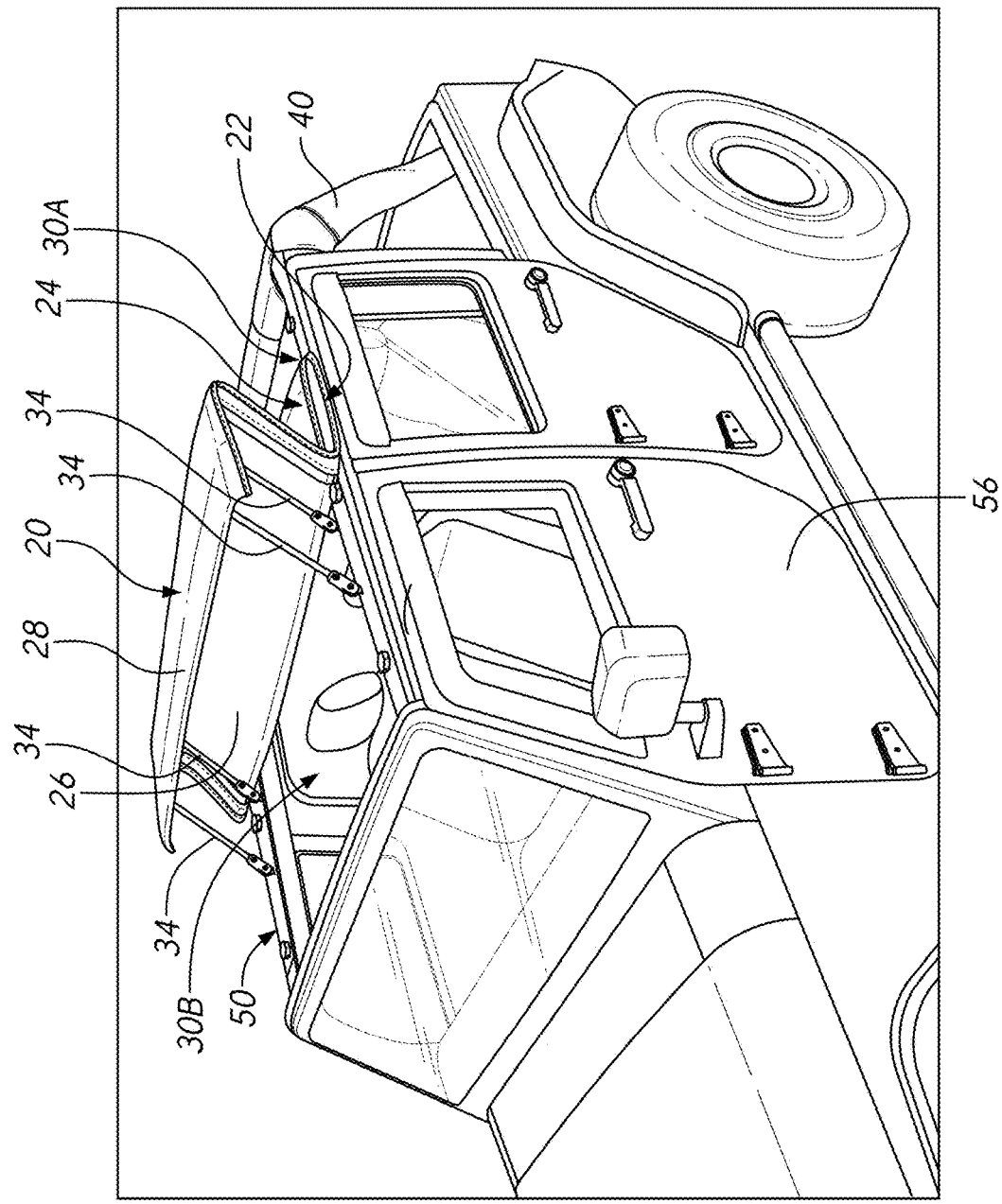
FIGS. 17-18 show perspective views of the cover of the folding top assembly of FIG. 1 with the front and rear seating areas of a vehicle exposed.
Figure 18:
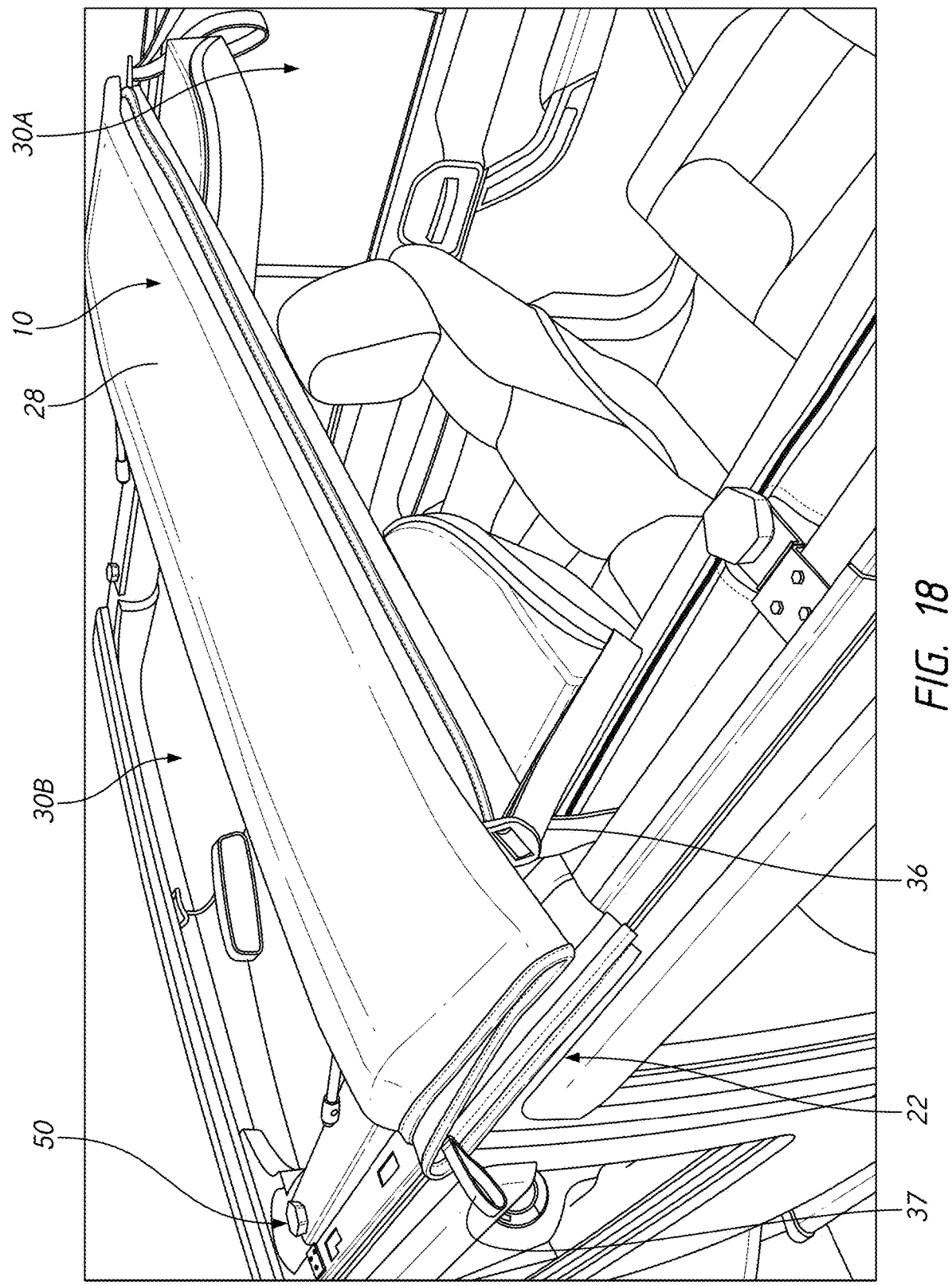

As illustrated in FIGS. 9-22, the cover 16 can be bendable and/or foldable. As illustrated in FIGS. 9-16, in some embodiments, the cover 16 is folded to expose a first space 30A extending over the rear seating area 14. In some embodiments, the cover 16 is folded to expose a second space 30B extending over the front seating area 12. As illustrated in FIGS. 17-18, in some embodiments, the cover 16 is folded to expose both the first space 30A and the second space 30B. Advantageously, the order in which the panel segments of the cover 16 are moved to transition the folding top assembly 10 from one position to another, and the number of steps taken, can vary. For example, the first space 30A can be exposed before the second space 30B, the second space 30B can be exposed before the first space 30A, and one of the first space 30A and the second space 30B can be exposed while the other remains covered by the cover 16.

Figure 9:
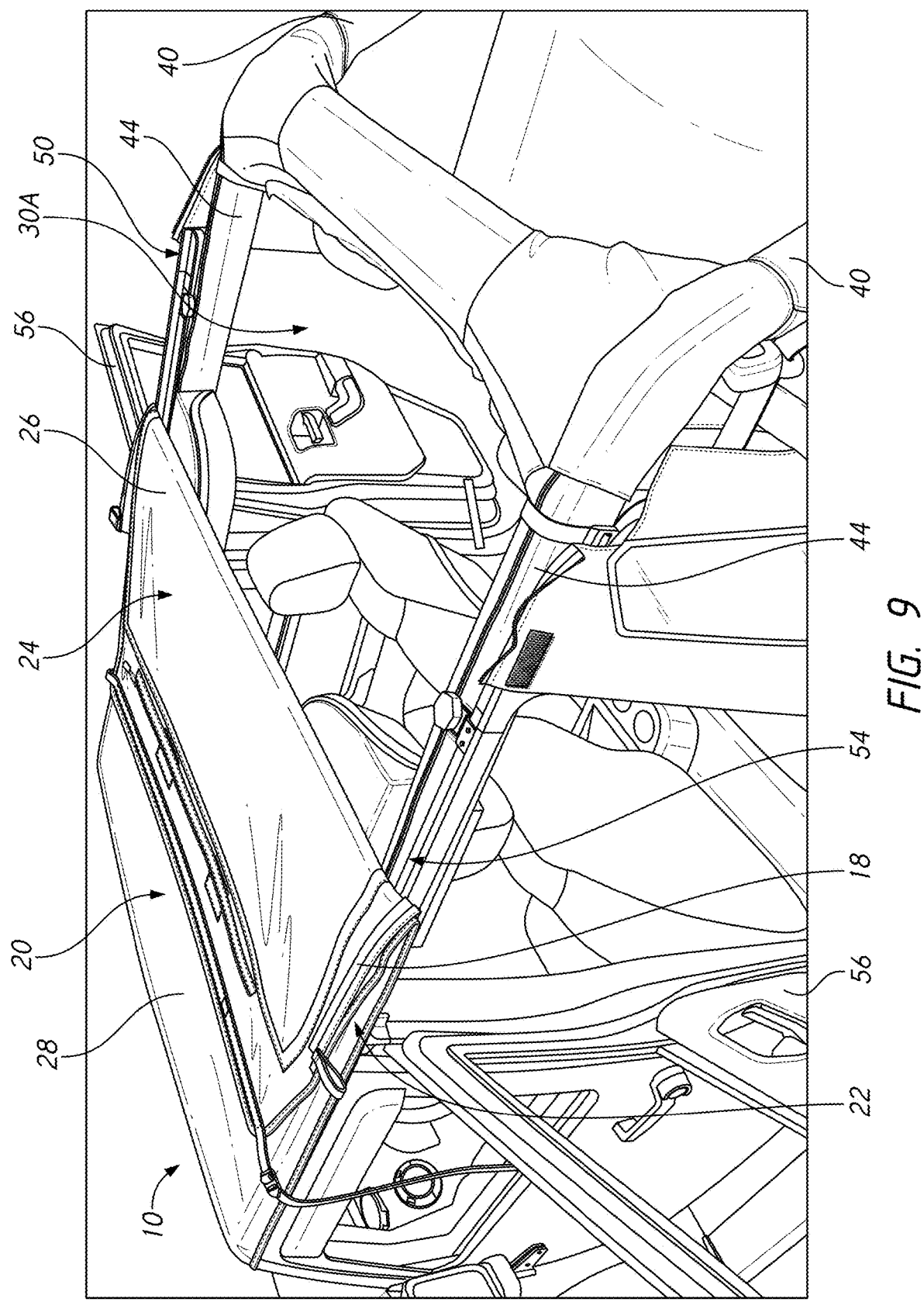
FIGS. 9-10 show perspective views of the cover of the folding top assembly of FIG. 1 with the rear seating area of a vehicle exposed.

As shown in FIG. 9, in some embodiments, the rear panel segment 24 can be folded forward to expose the first space 30A. The outer surface 28 of the rear panel segment 24 can be folded flat on top of the outer surface 28 of the front panel segment 20 and/or middle panel segment 22.

Figure 10:
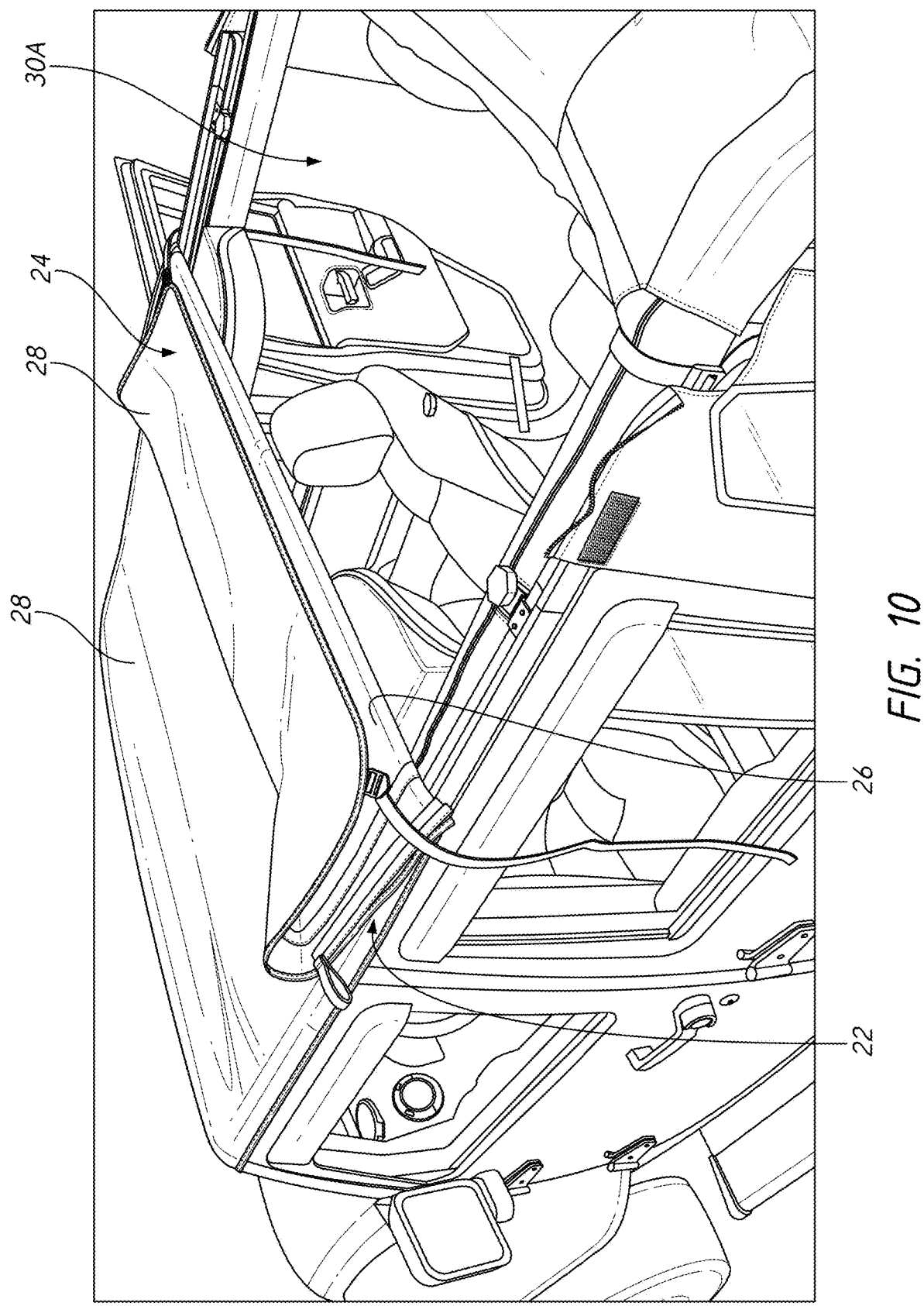
Figure 13:
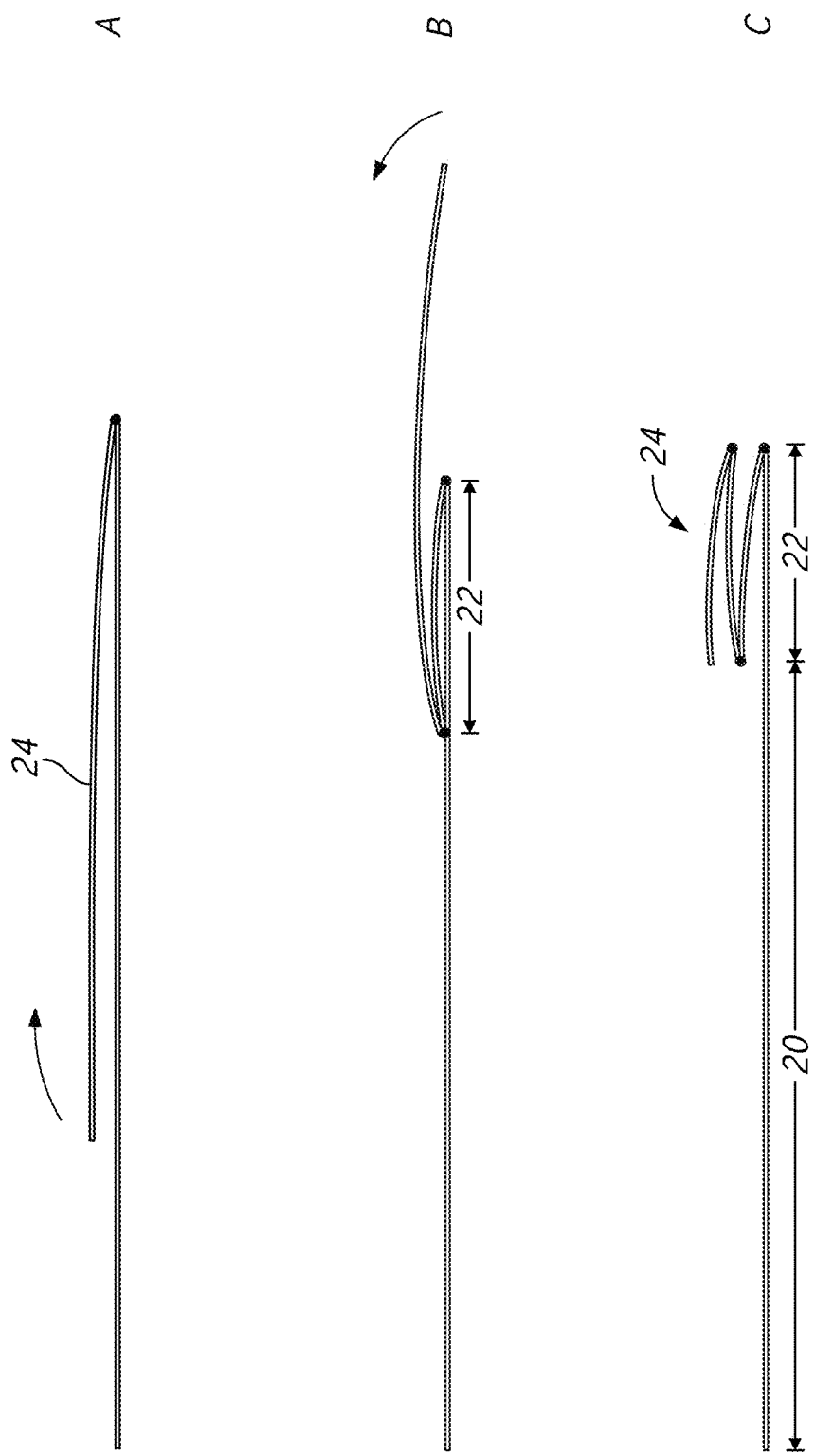

The rear panel segment 24 can be folded further after initially being folded forward over the middle panel segment 22. For example, as shown in FIG. 10, in some embodiments, a first portion of the rear panel segment 24 can be folded rearward over a second portion of the rear panel segment 24. This can advantageously make the folded portion of the cover 16 more compact, maximizing the first space 30A above the rear seating area 14 and further stabilizing the folded portion of the cover 16 while the vehicle 100 is moving. Certain other methods for folding the cover 16 can benefit from some similar advantages. For example, in some embodiments, as illustrated in FIG. 11, a first portion of the rear panel segment 24 can be folded rearward under a second portion of the rear panel segment 24. In some embodiments, as illustrated in FIG. 13, a first portion of the rear panel segment 24 can be folded rearward over a second portion of the rear panel segment 24 (e.g., step A to step B) and the first portion can be further folded forward on top of itself (e.g., step B to step C).

As illustrated in FIG. 12, in some embodiments, folding the rear panel segment 24 forward to expose the first space 30A can include folding a first portion of the rear panel segment 24 over a second portion of the rear panel segment 24 (e.g., step A) and folding the first and second portions of the rear panel segment 24 over the middle panel segment 22 (e.g., step B). In some embodiments, folding the rear panel segment 22 forward over the middle panel segment 22 includes placing at least a portion of the outer surface 28 of the rear panel segment 24 in contact with the outer surface 28 of the middle panel segment 22.

Figure 16:
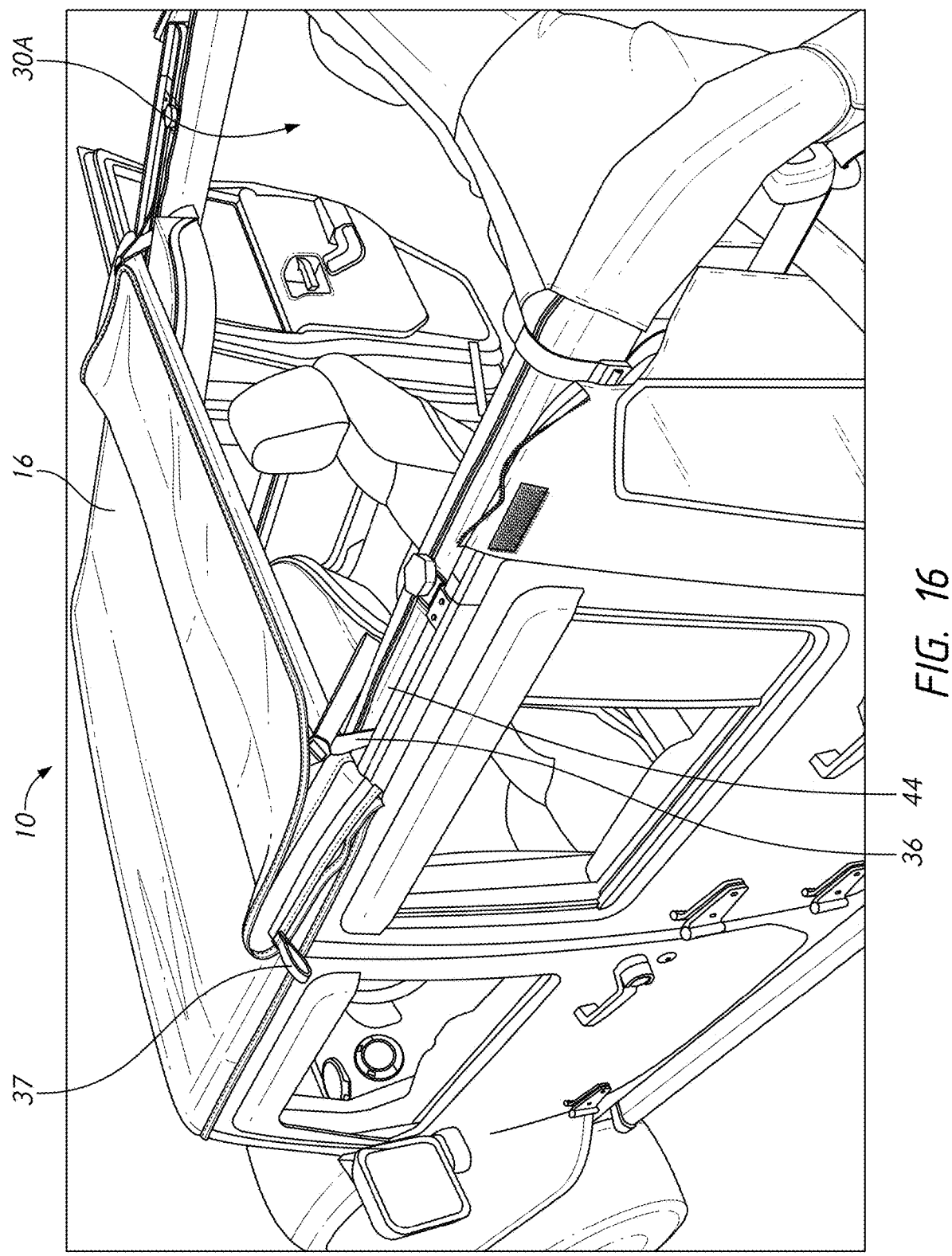
FIG. 16 shows a perspective view of the cover of the folding top assembly of FIG. 1 with the rear seating area of a vehicle exposed.

As illustrated in FIG. 16, in some embodiments, the rear panel segment 24 can be folded over the middle panel segment 22 and the front panel segment 20 can remain extended. In some embodiments, the front panel segment 20 can be folded over the middle panel segment 22 and the rear panel segment can remain extended.

As shown in FIG. 17, in some embodiments, the front panel segment 20 can be folded rearward to expose the second space 30B. In some embodiments, the rear panel segment 24 is configured to cover and/or expose the first space 30A extending over the rear seating area 14. In some embodiments, the front panel segment 20 is configured to cover and/or expose the second space 30B extending over the front seating area 12.

In some embodiments, the folding top assembly 10 includes arms 34. As illustrated in FIG. 17, in some embodiments, the folding top assembly 10 can have a first pair of arms 34 and a second pair of arms 34. In some embodiments, including the illustrated embodiment, the arms 34 are coupled to the front panel segment 20 and can be bent or collapsed over the middle panel segment 22 in the process of moving the folding top assembly 10 from one position to another. Folding the assembly 10 as described can increase the speed and ease with which the cover 16 is folded and can increase the rigidity of the stored cover 16. In some embodiments, the arms 34 allow the user to fold the front panel segment 20 back without the user leaving the interior of the vehicle 100. Advantageously, when the arms 34 are bent and pushed rearward, the arms 34 can hold down (e.g., clamp down, weigh down, flatten, etc.) not only the front panel segment 20 but also the middle panel segment 22 and the rear panel segment 24 folded beneath the front panel segment 20. This can streamline (e.g., flatten, stabilize, etc.) the folding top assembly 10 and reduce the effects of wind and vehicle motion on the storage of the folded cover 16 and therefore on the driving experience. Certain other configurations of arms 34 can have some similar advantages. In some embodiments, the arms 34 are integral with the frame assembly 50 and are configured to couple to the cover 16 of the folding top assembly 10. The arms 34 can be disposed towards the front, middle, and/or rear of the frame assembly 50. In some embodiments, the folding top assembly 10 and/or frame assembly 50 can have a first and second pair of arms 34 disposed towards the front of the vehicle 100 and a third and fourth pair of arms 34 disposed towards the rear of the vehicle 100. In some embodiments, the arms 34 can couple to the front panel segment 20, the middle panel segment 22, and/or the rear panel segment 24 of the cover 16. More details of an arm assembly for the forward opening of the folding top assembly and a frame assembly can be found in U.S. Pat. No. 10,065,486, which is hereby incorporated in its entirety by reference as if fully set forth herein.

As shown in FIG. 18, in some embodiments, both the front panel segment 20 and the rear panel segment 24 can be folded over the middle panel segment 22. In some embodiments, the rear panel segment 24 is folded forward over the middle panel segment 22 before the front panel segment 20 is folded rearward over the rear panel segment 24. In some embodiments, the front panel segment 20 is folded rearward over the middle panel segment 22 before the rear panel segment 24 is folded forward over the front panel segment 20. Any of the panel segments can be in contact with any of the other panel segments when the folding top assembly 10 is in a folded position. The order in which the panel segments are folded can vary. The folding top assembly 10 can fold on top of itself over the front panel segment 20, the middle panel segment 22, and/or the rear panel segment 24.

The panel segments 20, 22, 24 can be folded in various positions. For example, as illustrated in FIG. 17, in some embodiments, folding the front panel segment 20 rearward to expose the second space 30B includes folding a first portion of the front panel segment 20 over a second portion of the front panel segment 20 and folding the first and second portions of the front panel segment 20 over the middle panel segment 22. In some embodiments, folding the front panel segment 20 rearward over the middle panel segment 22 includes placing at least a portion of the outer surface 28 of the front panel segment 20 in contact with at least a portion of the outer surface 28 of the rear panel segment 24.

Figure 15:
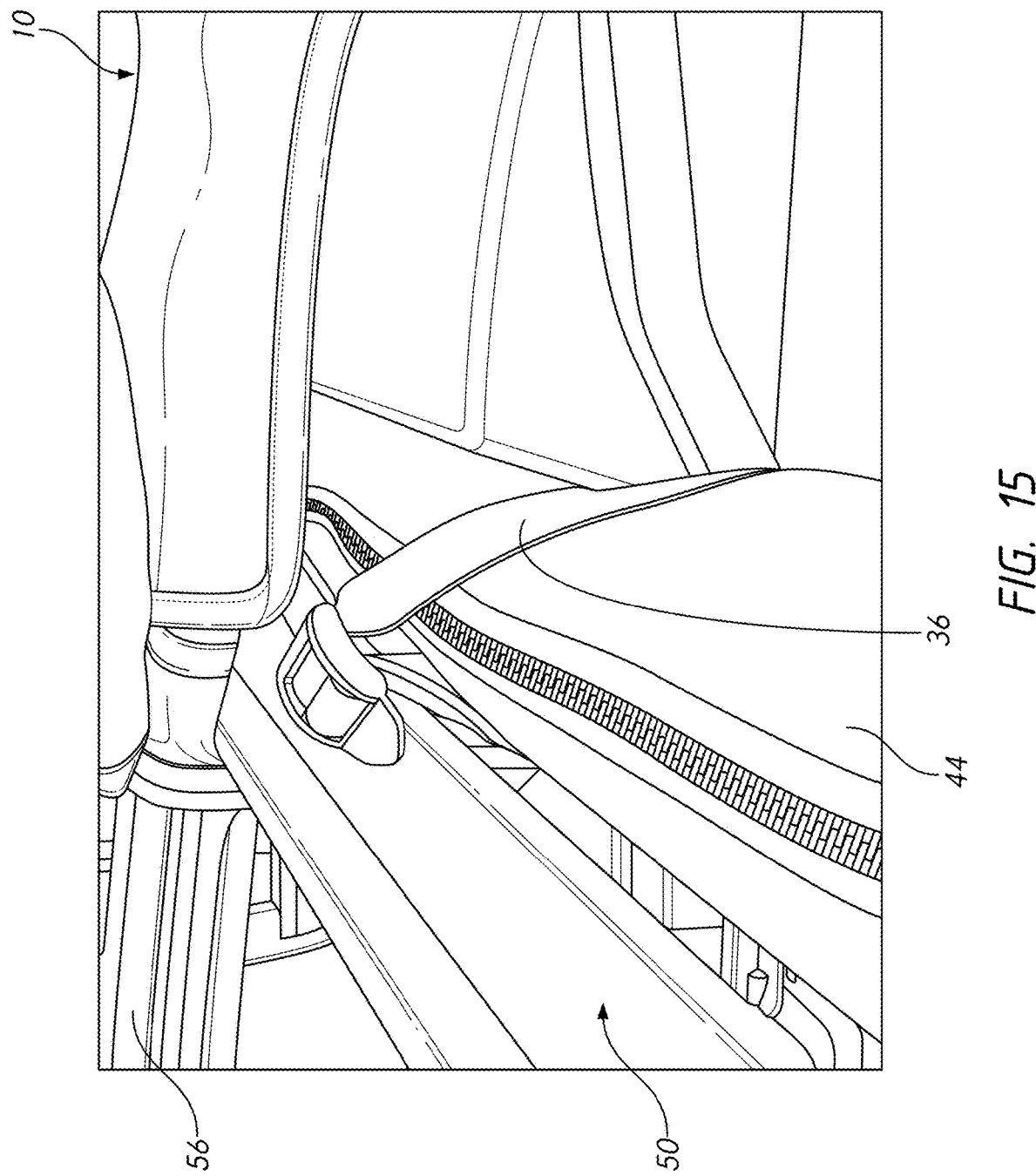

The cover 16 can be secured in various positions. As illustrated in FIGS. 14-16, in some embodiments, the rear panel segment 24 is secured in a first folded position, where at least a portion of the rear panel segment 24 is folded over the middle panel segment 22. As illustrated in FIGS. 18-22, in some embodiments, the front panel segment 20 is secured in a second folded position where at least a portion of the front panel segment 20 is folded over the middle panel segment 22. In some embodiments, the rear panel segment 24 is secured in the first folded position and the front panel segment 20 is secured in the second folded position.

Figure 19:
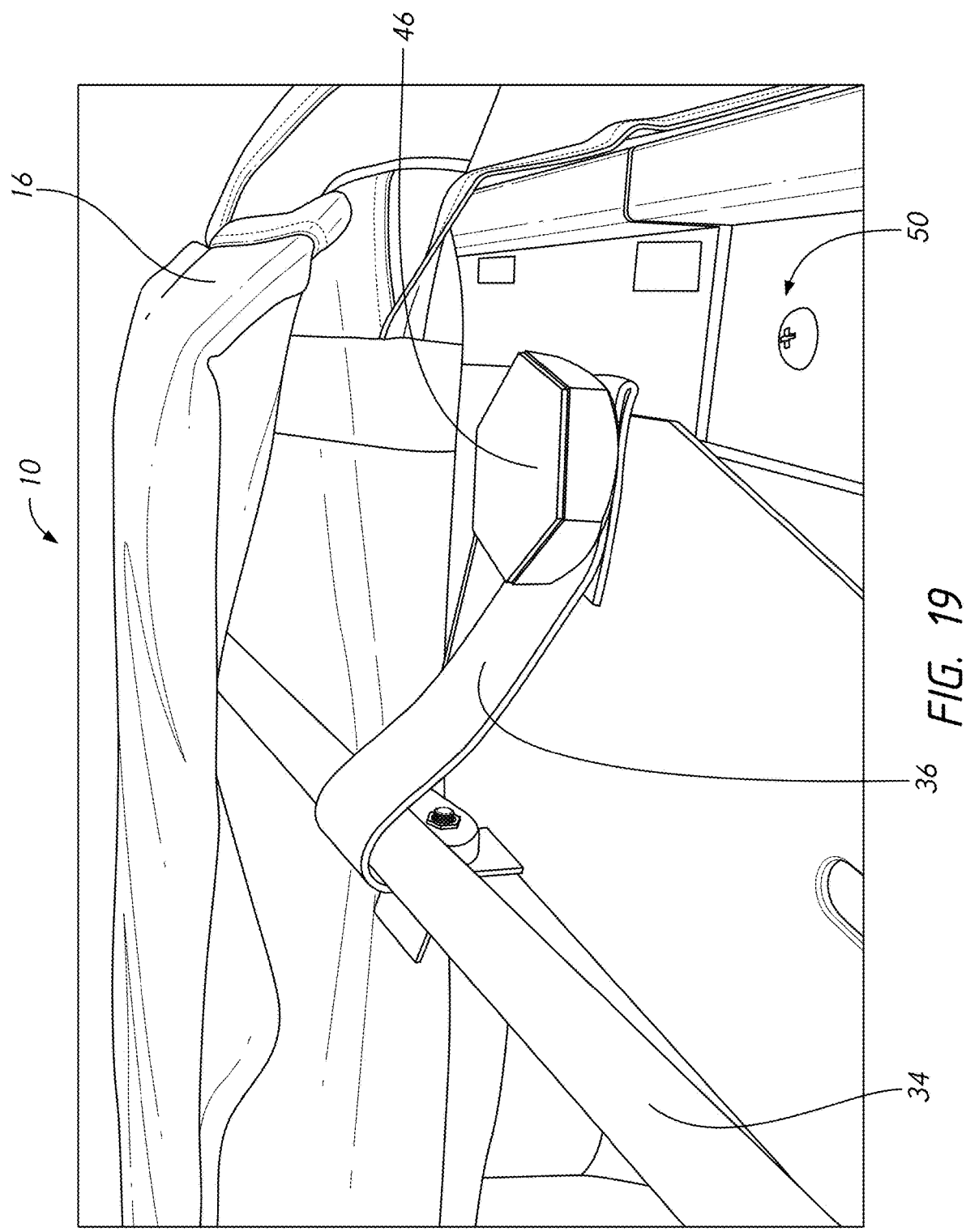
FIG. 19 shows a detailed view of a strap of the folding top assembly of FIG. 1.

The cover 16 can be secured using any suitable mechanism coupled to any suitable location on the cover 16. For example, as illustrated in FIG. 16, in some embodiments, securing the rear panel segment 24 in the first folded position can include coupling fasteners 36, such as straps, to lateral portions of the vehicle 100. As illustrated in FIG. 22, in some embodiments, securing the front panel segment 20 in the second folded position can include coupling fasteners 36, such as straps, to lateral portions of the vehicle 100. As illustrated in FIGS. 15 and 18, in some embodiments, the fasteners 36 comprise straps that are coupled to the cover 16 and can be wrapped or tied around lateral portions of the vehicle 100, such as side beams 44, and/or lateral portions of the frame assembly 50. As illustrated in FIG. 19, in some embodiments, the fasteners 36 comprise straps that can be connected to the vehicle 100 and/or frame assembly 50 by a removable bolt 46. The fasteners 36 can be coupled to the cover 16 and/or to the arms 34. In some embodiments, the fasteners 36 are configured to prevent the arms 34 from rotating when the vehicle 100 is moving. The fastener 36 can have a hole in it sized and shaped to receive a portion of the bolt 46. The bolt 46 can be tapered and/or threaded and can secure the fastener 36 to the vehicle 100 and/or frame assembly 50.

In some embodiments, the fasteners 36 that are used to secure the cover 16 in folded positions are the same fasteners 36 that are used to secure the cover 16 in extended positions. In some embodiments, the fasteners 36 that are used to secure the cover 16 in folded positions are distinct from the fasteners 36 that are used to secure the cover 16 in extended positions.

Figure 20:
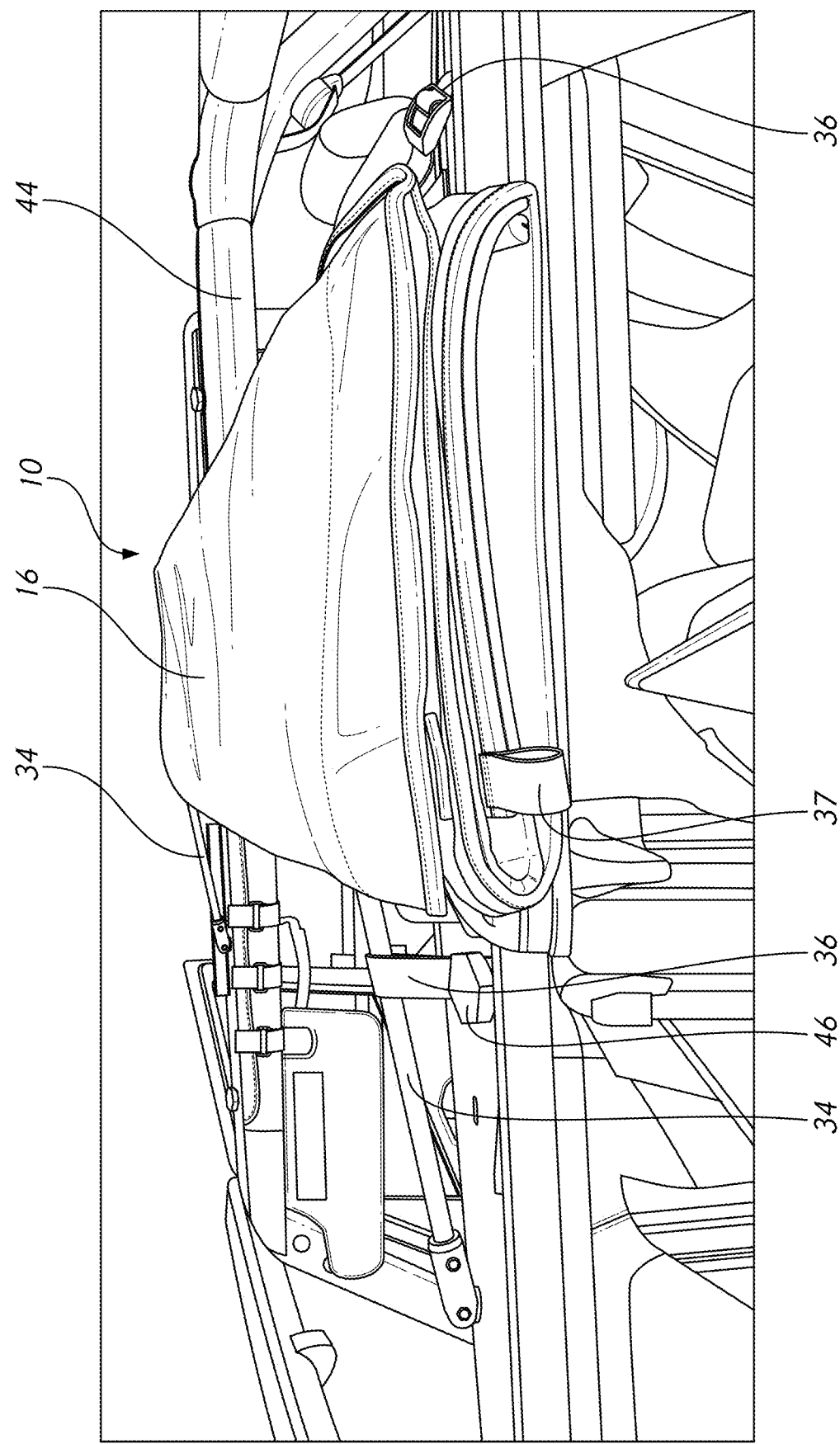
FIG. 20-21 shows side views of the folding top assembly of FIG. 1 with the front and rear seating areas of a vehicle exposed.
Figure 21:
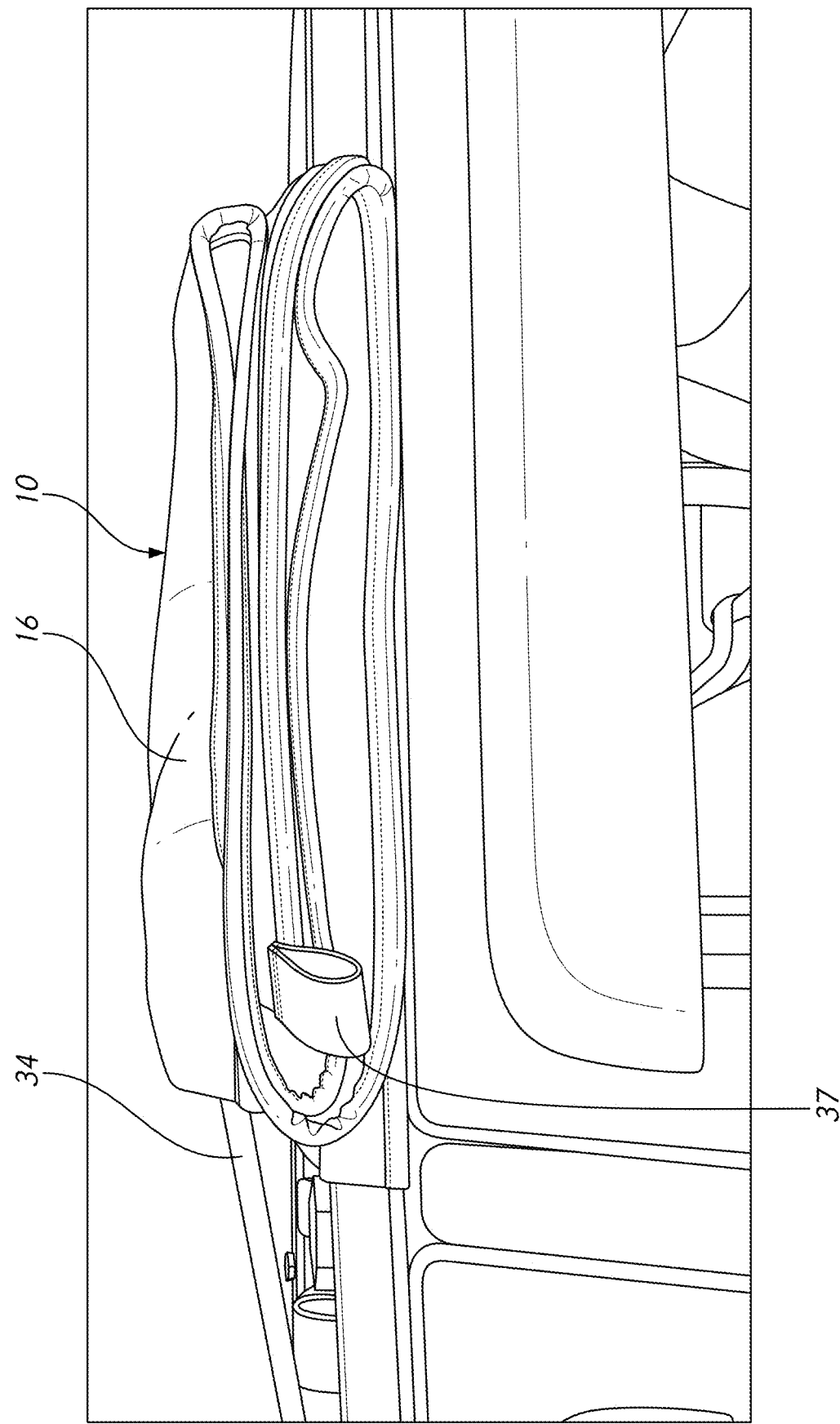

In some embodiments, as shown in FIGS. 20-22, the cover 16 can include tabs 37. The tabs 37 can be disposed on lateral portions of the cover 16. The tabs 37 can be disposed on the inner surface 26 and/or outer surface 28 of the cover 16. The tabs can assist the user in holding onto, and repositioning, the panel segments of the cover 16.

From the foregoing description, it will be appreciated that inventive folding vehicle tops and related methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations and/or "some embodiments" can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A folding top assembly for use on a vehicle, the vehicle having a front seating area and a rear seating area, the folding top assembly comprising:
    a cover having a front panel segment, a rear panel segment, and a middle panel segment between the front panel segment and the rear panel segment, the front panel segment configured to be positioned above the front seating area when in an extended position and the rear panel segment configured to be positioned above the rear seating area when in an extended position; and
    a frame assembly comprising a first pair of arms, and a second pair of arms, the first pair of arms and the second pair of arms each coupled to the front panel segment, wherein the first pair of arms and the second pair of arms are each configured to bend over the middle panel segment when transitioning the cover to a stowed position; and
    wherein when in a stowed position the rear panel segment is folded over the middle panel segment such that the rear panel segment is positioned between the middle panel segment and the front panel segment, the front panel segment at least partially securing the rear panel segment in the stowed position.

2. The folding top assembly of claim 1, wherein the frame assembly further comprises a plurality of door surrounds, the plurality of door surrounds defining channels configured to engage portions of the cover.

3. The folding top assembly of claim 1, wherein the cover further comprises interengaging portions configured to cooperate with the frame assembly.

4. The folding top assembly of claim 3, wherein the interengaging portions are interlocking portions.

5. The folding top assembly of claim 1, wherein the frame assembly further comprises a first longitudinal portion and a second longitudinal portion opposite the first longitudinal portion extending along lateral sides of the vehicle.

6. The folding top assembly of claim 5, wherein the frame assembly further comprises at least one cross-member extending between the first longitudinal portion and the second longitudinal portion.

7. The folding top assembly of claim 1, further comprising fasteners configured to at least partially secure the front panel segment or the rear panel segment when in a stowed position.

8. A folding top assembly for use on a vehicle, the vehicle having a front seating area and a rear seating area, the folding top assembly comprising:
    a cover having a front panel segment, a rear panel segment, and a middle panel segment between the front panel segment and the rear panel segment, the front panel segment configured to be positioned above the front seating area when in an extended position and the rear panel segment configured to be positioned above the rear seating area when in an extended position, wherein the cover comprises interengaging portions disposed on an inner surface of the cover, the interengaging portions configured to engage and couple the cover to the vehicle when in an extended position; and
    wherein when in a stowed position the rear panel segment is folded over the middle panel segment such that the rear panel segment is positioned between the middle panel segment and the front panel segment, the front panel segment at least partially securing the rear panel segment in the stowed position.

9. The folding top assembly of claim 8, wherein the interengaging portions are interlocking portions.

10. The folding top assembly of claim 8, wherein the interengaging portions of projections configured to engage channels of the vehicle.

11. The folding top assembly of claim 8, further comprising fasteners configured to at least partially secure the front panel segment or the rear panel segment when in a stowed position.

12. The folding top assembly of claim 8, further comprising a frame assembly having a first pair of arms, and a second pair of arms, the first pair of arms and the second pair of arms each coupled to the front panel segment, wherein the first pair of arms and the second pair of arms are each configured to bend over the middle panel segment when transitioning the cover to the stowed position.

13. The folding top assembly of claim 12, wherein the frame assembly further comprises a first longitudinal portion and a second longitudinal portion opposite the first longitudinal portion extending along lateral sides of the vehicle.

14. The folding top assembly of claim 13, wherein the frame assembly further comprises at least one cross-member extending between the first longitudinal portion and the second longitudinal portion.

15. The folding top assembly of claim 12, wherein the frame assembly further comprises a plurality of door surrounds, the plurality of door surrounds defining channels configured to engage the interengaging portions of the cover.

* * * * *